(12) United States Patent
Szajewski et al.

(10) Patent No.: US 7,260,323 B2
(45) Date of Patent: *Aug. 21, 2007

(54) IMAGING USING SILVER HALIDE FILMS WITH MICRO-LENS CAPTURE, SCANNING AND DIGITAL RECONSTRUCTION

(75) Inventors: Richard P. Szajewski, Rochester, NY (US); Lyn M. Irving, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1004 days.

This patent is subject to a terminal disclaimer.

(21) Appl. No.: 10/170,148

(22) Filed: Jun. 12, 2002

(65) Prior Publication Data

US 2003/0231255 A1    Dec. 18, 2003

(51) Int. Cl.
*G03B 7/093* (2006.01)
*G03B 41/00* (2006.01)
*H04N 1/04* (2006.01)

(52) U.S. Cl. .................... 396/246; 396/322
(58) Field of Classification Search ............. 396/246, 396/322, 332; 358/487
See application file for complete search history.

(56) References Cited

U.S. PATENT DOCUMENTS

| | | | |
|---|---|---|---|
| 992,151 A | 5/1911 | Berthon | |
| 1,746,584 A | 2/1930 | Fournier | |
| 1,749,278 A | 3/1930 | Frederick | |
| 1,824,353 A | 9/1931 | Jensen | |
| 1,838,173 A | 12/1931 | Chretien | |
| 1,849,036 A | 3/1932 | Ernst | |
| 1,942,841 A | 1/1934 | Shimizu | |
| 1,985,731 A | 12/1934 | Ives | |
| 2,143,762 A | 1/1939 | Carstaff | |
| 2,144,649 A | 1/1939 | Eggert et al. | |

(Continued)

FOREIGN PATENT DOCUMENTS

JP    05-145857    6/1993

(Continued)

OTHER PUBLICATIONS

Edward M. Crane and C. H. Evans, "Devices for Making Sensitometric Exposures on Embossed Kinescope Recording Film" Jan. 1958, pp. 13-16, Journals of the SMPTE vol. 67.

(Continued)

*Primary Examiner*—W. B. Perkey

(57) ABSTRACT

The present invention resides in a method and apparatii for using a photosensitive element that is photosensitive to light within a predetermined range of exposures to capture images including exposures that are outside of the predetermined exposure range. In this method the photosensitive element is exposed to light from the scene. The light from the scene is fractured into concentrated portions and residual portions; with the concentrated portions directed at concentrated images areas of the photosensitive element to form a pattern of concentrated image elements providing a concentrated image when light from the scene is within a first exposure range. The residual portions of the light are directed at a residual image area of the photosensitive element and form an image in the residual image area when light from the scene is within a second exposure range. Wherein the combination of the first range and second range is greater than a predetermined range of exposure.

91 Claims, 17 Drawing Sheets

U.S. PATENT DOCUMENTS

| | | |
|---|---|---|
| 2,191,038 A | 2/1940 | Capstaff |
| 2,252,006 A | 8/1941 | Holst et al. |
| 2,304,988 A | 12/1942 | Yule |
| 2,316,644 A | 4/1943 | Yule |
| 2,407,211 A | 9/1946 | Yule |
| 2,455,849 A | 12/1948 | Yule |
| 2,691,586 A | 10/1954 | Yule et al. |
| 2,992,103 A | 7/1961 | Land et al. |
| 3,413,117 A | 11/1968 | Gaynor |
| 3,506,350 A | 4/1970 | Denner |
| 3,905,701 A | 9/1975 | David |
| 3,954,334 A | 5/1976 | Bestenreiner et al. |
| 3,973,953 A | 8/1976 | Montgomery |
| 3,973,954 A | 8/1976 | Bean |
| 3,973,957 A | 8/1976 | Montgomery |
| 3,973,958 A | 8/1976 | Bean |
| 4,040,830 A | 8/1977 | Rogers |
| 4,272,186 A | 6/1981 | Plummer |
| 4,458,002 A | 7/1984 | Janssens et al. |
| 4,483,916 A | 11/1984 | Thiers |
| 5,464,128 A | 11/1995 | Keller |
| 5,649,250 A | 7/1997 | Sasaki |
| 5,744,291 A | 4/1998 | Ip |
| 6,868,231 B2 * | 3/2005 | Irving et al. ............ 396/322 |

FOREIGN PATENT DOCUMENTS

| | | |
|---|---|---|
| JP | 08-125933 | 5/1996 |
| JP | 2001-147466 | 5/2001 |

OTHER PUBLICATIONS

J.S. Courtney-Pratt, "Lenticular Plate Multiple Picture Shadowgraph Recording", Sep. 1961, pp. 710-715, Journal of the SMPTE, vol. 70.

C.H. Evans and R.B. Smith, "Color Kinescope Recording on Embossed Film" Jul. 1956, pp. 365-372, Journal of the SMPTE, vol. 65.

Rudolf Kingslake, "The Optics of the Lenticular Color-Film Process", Jan. 1958, pp. 8-13, Journal of the SMPTE, vol. 67.

Furukawa, et al., "A ⅓-inch 380K Pixel (Effective) IT-CCD Image Sensor", Jun. 5, 1992, pp. 595-600, IEEE, vol. 38, No. 3.

Deguchi et al., "Microlens Design Using Simulation Program For CCD Image Sensor", Jun. 5, 1992, pp. 583-589, IEEE, vol. 38, No. 3, Aug. 1992.

* cited by examiner

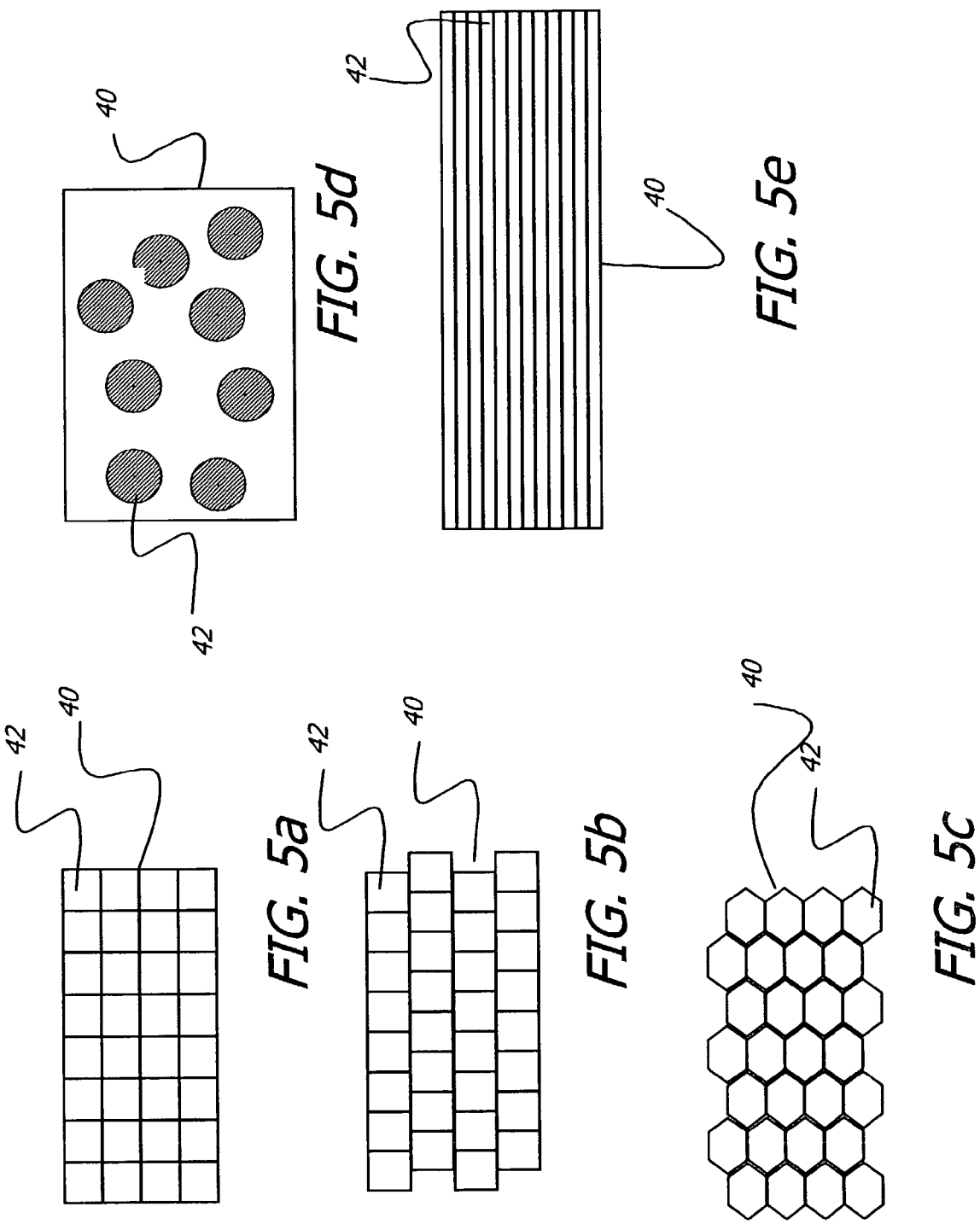

IMAGING USING SILVER HALIDE FILMS WITH MICRO-LENS CAPTURE, SCANNING AND DIGITAL RECONSTRUCTION

CROSS-REFERENCE TO RELATED APPLICATIONS

This application is related to U.S. patent applications Ser. No. 10/170,607, entitled CAMERA SPEED COLOR FILM WITH BASE SIDE MICRO-LENSES; in the names of Lyn Irving and Richard Szajewski; U.S. patent application Ser. No. 10/171,012, entitled LENTIDULAR IMAGING WITH INCORPORATED BEADS, in the names of Krishnan Chari, Lyn Irving and Richard Szajewski; U.S. patent application Ser. No. 10/167,746, entitled CAMERA SPEED COLOR FILM WITH EMULSION SIDE MICRO-LENSES, in the names of Richard Szajewski and Lyn Irving; and U.S. patent application Ser. No. 10/167,794, entitled IMAGING USING SILVER HALIDE FILMS WITH MICRO-LENS CAPTURE, AND OPTICAL RECONSTRUCTION in the names of Richard Szajewski and Lyn Irving, all filed concurrently herewith, the contents of which are incorporated herein by reference.

FIELD OF THE INVENTION

The present invention relates to the field of photosensitive element based photography and more particularly to a method and apparatii for using a photosensitive element that is photosensitive to light within a predetermined range of exposure levels to capture images including exposure levels that are outside the predetermined range.

BACKGROUND OF THE INVENTION

In conventional photography, it is well known to record images by controllably exposing a photosensitive element to light from a scene. Typically, such a photosensitive element comprises one or more photosensitive layers supported by a flexible substrate such as film and/or a non-flexible substrate such as a glass plate. The photosensitive layers, which can have one or more light sensitive silver halide emulsions along with product appropriate imaging chemistry, react to the energy provided by the light from the scene. The extent of this reaction is a function of the amount of light received per unit area of the element during exposure. The extent of this reaction is greater in areas of the element that are exposed to more light during an exposure than in areas that are exposed to less light. Thus, when light from the scene is focused onto a photosensitive element, differences in the levels of light from the scene are captured as differences in the extent of the reaction in the layers. After a development step, the differences in the extent of the reaction in the layers appear as picture regions having different densities. These densities form an image of the original scene luminance.

It is characteristic of silver halide emulsions to have a non-linear response when exposed to ambient light from a scene. In this regard a photosensitive element has a lower response threshold that defines the minimum exposure at which the incorporated emulsions and associated chemistry begins to react so that different levels of exposure enable the formation of different densities. This lower threshold ultimately relates to the quantum efficiency of individual silver halide emulsion grains. Typically, all portions of a photosensitive element that are exposed to light at a level below the lower response threshold have a common appearance when the photosensitive element is developed.

Further, a photosensitive element also has an upper response threshold that defines the exposure level below which the emulsion and associated chemistries react so that different levels of exposure enable the formation of different densities. Typically, all portions of an element that are exposed at a level above the upper response threshold will again have a common appearance after the photosensitive element is developed.

Thus photosensitive elements that use silver halide emulsions can be said to have both a lower response threshold and an upper response threshold which bracket a useful range of exposures wherein the photosensitive element is capable of reacting to differences in exposure levels by recording a contrast pattern with contrast differences that are differentiable. The exposure levels associated with these lower and upper thresholds define the exposure latitude of the photosensitive element. To optimize the appearance of an image, therefore, it is typically useful to arrange the exposure so that the range of exposure levels encountered by the photosensitive element during exposure is within the latitude or useful range of the photosensitive element.

Many consumer and professional photographers prefer to use photosensitive elements, camera systems, and photography methods that permit image capture over a wide range of photographic conditions. One approach to meeting this objective is to provide photosensitive elements with extremely wide latitude. However, extremely wide latitude photosensitive elements are fundamentally limited by the nature of the response of the individually incorporated silver halide grains to light. Accordingly, it is common to provide camera systems and photography methods that work to effectively extend the lower response limit and upper response limit of a photosensitive element by modifying the luminance characteristics of the scene. For example, it is known to effectively extend the lower response limit of the photosensitive element by providing supplemental illumination to dark scenes.

It is also known to increase the quantity of the light acting on a photosensitive element without providing supplemental illumination by using a taking lens system designed to pass a substantial amount of the available light from the scene to the photosensitive element during an exposure. However, lenses that pass a substantial amount of light also inherently reduce the depth-of field of the associated camera system. This solution is thus not universally suitable for pictorial imaging with fixed focus cameras since scenes may not then be properly focused. This solution is also not preferred in variable focused cameras as such lens systems can be expensive, and difficult to design, install and maintain.

There is a direct relationship between the duration of exposure and quantity of light from the scene that strikes the photosensitive element during an exposure. Accordingly, another way known in the art for increasing the amount of light acting on a photosensitive element during an exposure is to increase the duration of the exposure using the expedient of a longer open shutter. This, however, degrades upper exposure limits. Further, increased shutter open time can cause the shutter to remain open for a period that is long enough to permit the composition of a scene to evolve. This results in a blurred image. Accordingly, there is a desire to limit shutter open time.

Thus, what is also needed is a less complex and less costly camera system and photography method allowing the capture of images using conventional shutter open times and particularly with cameras having a fixed shutter time.

Another way to increase the quantity of the light acting on a photosensitive element during an exposure is to use a conventional taking lens system to collect light from a scene and to project this light from the scene onto an array of micro-lenses such as an array of linear lenticular lenses that are located proximate to the photosensitive element. An example of this is shown in Chretien U.S. Pat. No. 1,838,173. Each micro-lens concentrates a portion of the light from the scene onto associated areas of a photosensitive element. By concentrating light in this manner, the amount of light incident on each concentrated exposure area of the photosensitive element is increased to a level that is above the lower response threshold of the film. This permits an image to be formed by contrast patterns in the densities of the concentrated exposure areas.

Images formed in this manner are segmented: the concentrated exposure areas form a concentrated image of the scene and remaining portions of the photosensitive element form a pattern of unexposed artifacts intermingled with the concentrated image. In conventionally rendered prints of such images this pattern has an unpleasing low contrast and a half-tone look much like newspaper print.

However, a recognizable image can be obtained from such segmented images by projection under quite specific conditions. These conditions occur precisely when the spatial relationship between the effective camera aperture, the micro-lens array and the light sensitive element established at exposure in the camera is reproduced in the projector. This system can be cumbersome because a functional real image is produced at a position and magnification dictated by the original scene to camera lens arrangement. If a projection lens identical to the camera taking lens is positioned so as to mimic the camera lens to image relationship that existed at image taking, the reconstructed image will appear at the position of the original object with the size of the original object. Other lens and spatial relationship combinations result in incomplete image reconstruction and the formation of the dots and lines reminiscent of newspaper print. Thus, the micro-lens or lenticular assisted low light photography of the prior art is ill suited for the production of prints or for use in high quality markets such as those represented by consumers and professional photographers.

Micro-lens arrays, and in particular, lenticular arrays have found other applications in photography. For example, in the early days of color photography, linear lenticular image capture was used in combination with color filters as means for splitting the color spectrum to allow for color photography using black and white silver halide imaging systems. This technology was commercially employed in early color motion picture capture and projection systems as is described in commonly assigned U.S. Pat. No. 2,191,038. In the 1940s it was proposed to use lenticular screens to help capture color images using black and white photosensitive element in instant photography U.S. Pat. No. 2,922,103. In the 1970's, U.S. Pat. No. 4,272,186 disclosed the use of lenticular arrays to create images having increased contrast characteristics. By minimizing the size of the unexposed areas, the line pattern became almost invisible and was therefore less objectionable. Also in the 1970s, it was proposed to expose photosensitive element through a moving lenticular screen U.S. Pat. No. 3,954,334. Finally, in the 1990's linear lenticular-ridged supports having three-color layers and an antihalation layer were employed for 3-D image presentation materials. These linear lenticular arrays were used to form interleaved print images from multiple views of a scene captured in multiple lens camera. The interleaved images providing a three dimensional appearance. Examples of this technique are disclosed by Lo et al. in U.S. Pat No. 5,464,128 and by Ip, in U.S. Pat. No. 5,744,291. It is recognized that these disclosures relate to methods, elements and apparatus adapted to the formation of 3-D images from capture of multiple scene perspectives that are suitable for direct viewing. They fail to enable photography with shutter times suitable for use in hand-held cameras.

Thus, while micro-lens assisted photography has found a variety of uses, it has yet to fulfill the original promise of effectively extending the lower response threshold of a photosensitive element to permit the production of commercially acceptable prints from images captured at low scene brightness levels. What is needed, therefore, is a method and apparatus for capturing lenticular images on a photosensitive element and using the captured photosensitive element image to form a commercially acceptable print or other output.

It can also occur that it is useful to capture images under imaging conditions that are above the upper response threshold of the photosensitive element. Such conditions can occur with bright scenes that are to be captured under daylight, snow pack and beach situations. Typically, cameras use aperture control, shutter timing control and filtering systems to reduce the intensity of light from the scene so that the light that confronts the photosensitive element has an intensity that is within the upper limit response of the photosensitive element. However, these systems can add significant complexity and cost to the design of the camera. Further, the expedient of using a lens with a more open aperture to improve the lower threshold limit as discussed earlier simultaneously passes more light and degrades the exposure at the upper response threshold. Thus, what is also needed is a simple, less costly, camera system and photography method for capturing images over a range of exposure levels including exposure levels that are greater than the upper response limit of the photosensitive element.

SUMMARY OF THE INVENTION

According to a feature of the present invention a method is provided for using a photosensitive element that is photosensitive to light within a predetermined range of exposures to capture images including exposures that are outside of the predetermined range of exposures. In this method the photosensitive element is exposed to light from the scene. The light from the scene is fractured into concentrated portions and residual portions with the concentrated portions directed at concentrated images areas of the photosensitive element to form a pattern of concentrated image elements providing a concentrated image when light from the scene is within a first exposure range. The residual portions of the light are directed at a residual image area of the photosensitive element and form an image in the residual image area when light from the scene is within a second exposure range. Wherein the combination of the first range and second range is greater than the predetermined range of exposures.

BRIEF DESCRIPTION OF THE DRAWINGS

FIGS. 5a-5e show various diagrams illustrating embodiments of an array of micro-lenses useful in practicing the present invention.

DETAILED DESCRIPTION OF THE INVENTION

This invention is related to photography systems and photography methods that extend the effective image capture latitude of a photosensitive element.

Image Capture

Figure 1:
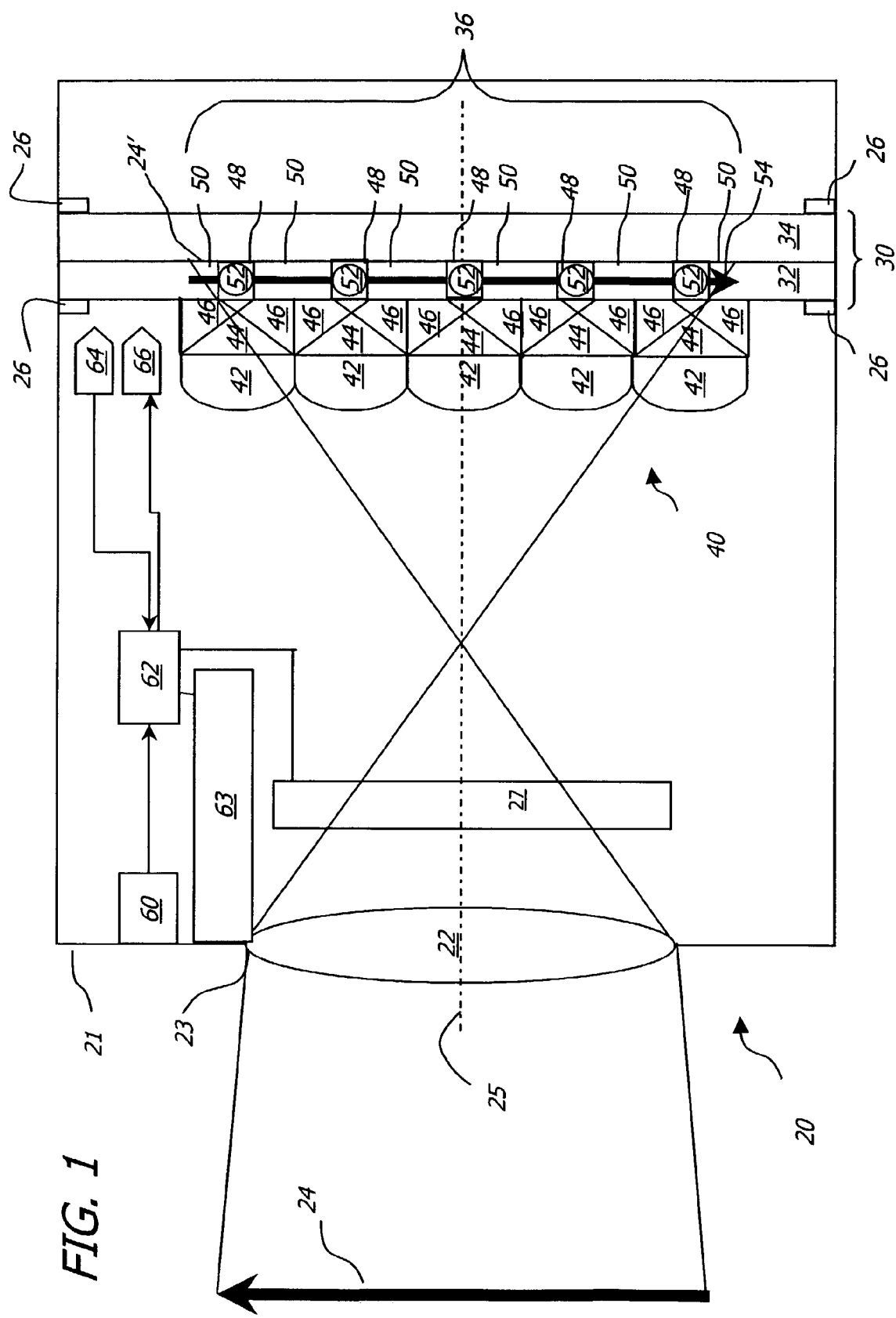
FIG. 1 shows a schematic view of one embodiment of a camera system according to the invention.

FIG. 1 shows a diagram useful in describing the operation of one embodiment of a camera 20 for forming an image on a photosensitive element 30 comprising a photosensitive layer 32 and a substrate 34. In the embodiment of FIG. 1, camera 20 includes a body 21 having an aperture 23 to admit light from a scene 24 into body 21. A taking lens system 22 directs light from a scene 24 along optical axis 25 toward a gate 26 that positions photosensitive element 30 at a defined distance from taking lens system 22 during exposure. In the embodiment shown, taking lens system 22 is located at aperture 23. Preferably, the depth of focus of the photosensitive element 30 plus taking lens system 22 is such that an image 24' is formed on an imaging area 36 of the photosensitive layer 32 with scene 24' having a consistent focus across the imaging area 36.

Interposed between taking lens system 22 and photosensitive element 30 is a micro-lens array 40 having a plurality of micro-lenses 42. Each of the micro-lenses 42 in micro-lens array 40 receives a portion of the light passing from the taking lens system 22 and fractures this light into a concentrated fraction 44 and a residual fraction 46. Each of the concentrated fractions 44 are concentrated onto associated concentrated image areas 48 of photosensitive element 30 and each residual fraction 46 passes to an associated residual image area 50 of photosensitive element 30. The effect of fracturing is shown conceptually in FIG. 1 and will now be described with reference to FIGS. 1 and 2a, 2b and 2c. A shutter system 27 is disposed between aperture 23 and micro-lens array 40. Shutter system 27 controllably permits light from the scene to expose photosensitive element 30 for a predefined period of time.

Figure 2A:
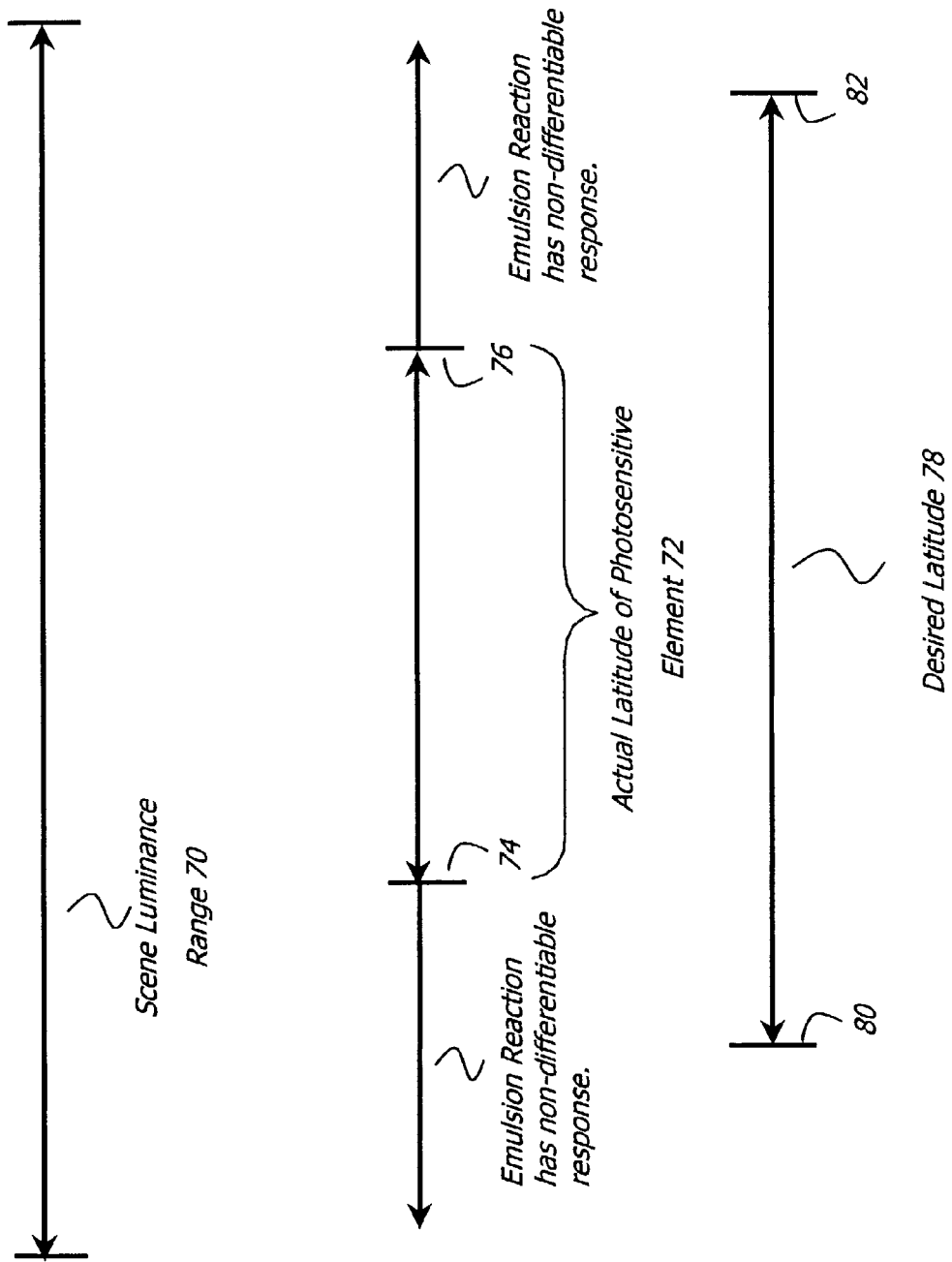
FIG. 2a is a diagram useful in describing the relationship between scene exposure actual latitude and effective latitude.

As is shown in FIG. 2a, light from a photographic scene extends, over a wide range of scene luminances. In the case of consumer photography, these are the luminances that are visually observable by humans. This range is indicated in FIG. 2a as scene luminance range 70. However, photosensitive element 30 has an actual latitude 72 within which the photosensitive element 30 can capture differences in scene illumination and record a contrast image of the scene. Because of the inherent limitations of chemical image capture technology and the specific non-linear response of the photosensitive element 30 to illumination from the scene, the actual latitude 72 of photosensitive element 30 is defined by a lower response threshold 74 and an upper response threshold 76. Photosensitive element 30 does not differentiably react to scene illumination differences when element 30 is exposed to quantities of light that are lower than the lower response threshold 74. As noted above, this is because the energy made available by such limited quantities of light is not sufficient to cause the emulsion to react to form a differentiable exposure record. Accordingly, all portions of photosensitive element 30 that are exposed to such quantities of light have a generally light appearance when photosensitive element 30 is photoprocessed.

Similarly, photosensitive element 30 does not differentiably react to scene illumination differences when element 30 is exposed to quantities of light that are higher than the upper response threshold 76. As noted in greater detail above, this is because the amount of light received by photosensitive element 30 above upper response threshold 76 is sufficient to drive the chemical reaction of the emulsion to a point wherein photosensitive element 30 no longer has a meaningful additional density response to additional light energy. Because of this, all portions of photosensitive element 30 that are exposed to such quantities of light have a generally dark appearance when the photosensitive element 30 is photoprocessed.

It is appreciated that the terms light and dark are appropriate for negative working photosensitive materials such as print films intended for use with negative working papers or for scanning. In positive working photosensitive materials such as reversal slide films and direct print films, the recited areas would be respectively dark and light in character.

Any known photosensitive material formulation can be used to prepare a photosensitive element 30 useful in the practice of the invention. Elements having excellent light sensitivity are best employed in the practice of this invention. The elements should have a sensitivity of at least about ISO 25, a sensitivity of at least about ISO 100, and more preferably have a sensitivity of at least about ISO 400. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number pH 2.27-1981

(ISO (ASA Speed)) and relates specifically the average of exposure levels required to produce a density of 0.15 above the minimum density in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

While standard photographic elements can be employed in this invention, the elements most useful in this invention are designed for capturing an image in machine readable form rather than in a form suitable for direct viewing. In the capture element, speed (the sensitivity of the element to low light conditions) is usually critical to obtaining sufficient image in such elements. Accordingly, the elements, after micro-lens speed enhancement will typically exhibit an equivalent ISO speed of 800 or greater, preferable an equivalent ISO speed of 1600 or greater and most preferably an equivalent ISO speed of 3200 or greater. The elements will have a latitude of at least 3.0 log E, and preferably a latitude of 4.0 log E, and more preferable a latitude of 5.0 log E or even higher in each color record. Such a high useful latitude dictates that the gamma of each color record (i.e. the slope of the Density vs. log E after photoprocessing) be less than 0.70, preferably less than 0.60, more preferably less than 0.50 and most preferably less than 0.45. Further, the color interactions between or interimage effects are preferably minimized. This minimization of interimage effect can be achieved by minimizing the quantity of masking couplers and DIR compounds. The interimage effect can be quantified as the ratio of the gamma of a particular color record after a color separation exposure and photoprocessing divided by the gamma of the same color record after a white light exposure. The gamma ratio of each color record is preferably between 0.8 and 1.2, more preferably between 0.9 and 1.1 and most preferably between 0.95 and 1.05. Further details of the construction, characteristic quantification of the performance of such scan enabled light sensitive elements are disclosed in Sowinski et al. U.S. Pat. Nos. 6,021,277 and 6,190,847, the disclosures of which are incorporated by reference.

Figure 2B:
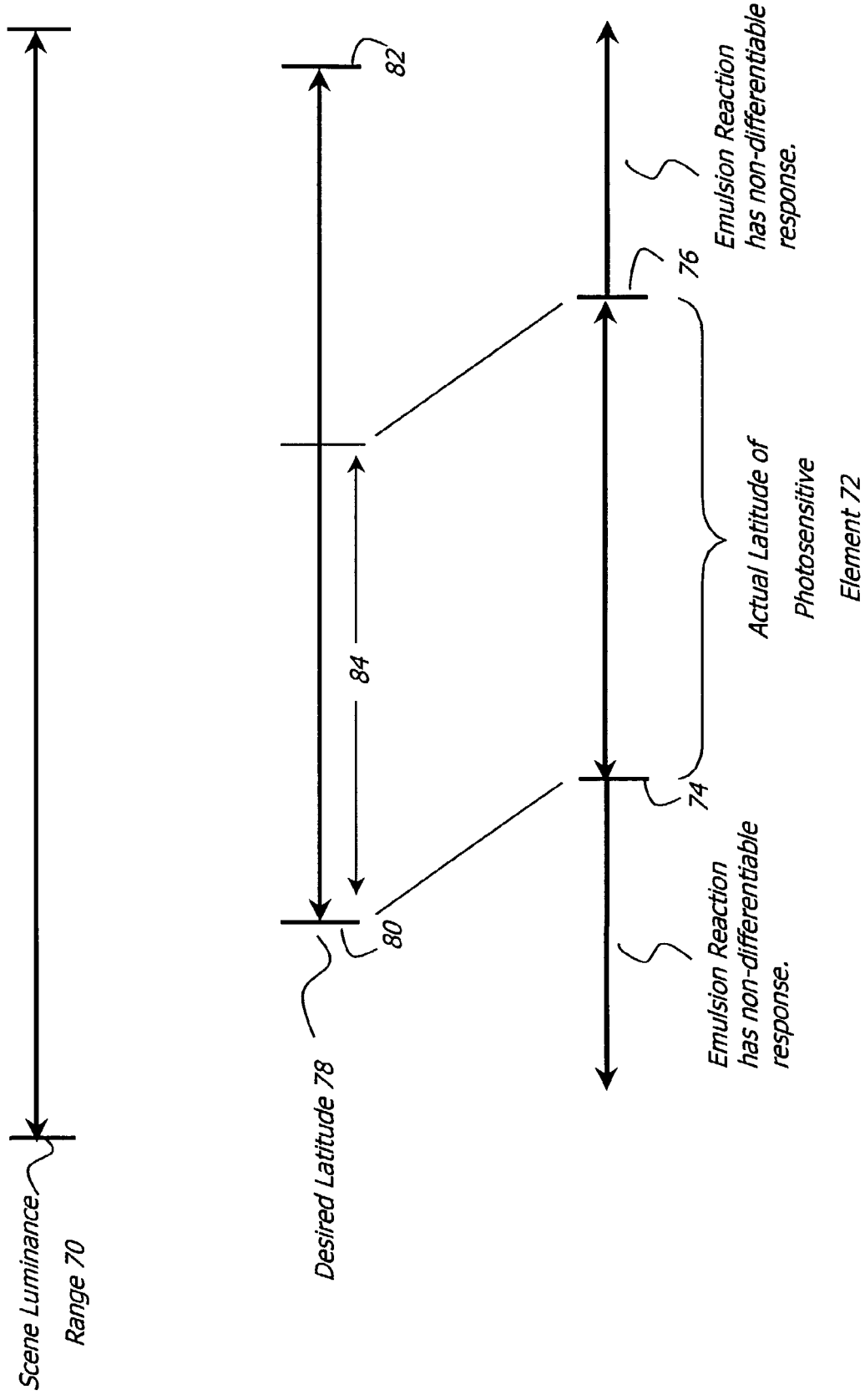
FIG. 2b is a diagram useful in describing the effect of concentrated light on a photosensitive element.

However, as is also shown in FIG. 2a, it is desirable that camera 20 and photosensitive element 30 should record scene information at a lower response threshold 80 that is lower than the lower response threshold 74 of photosensitive element 30 as is shown in FIG. 2a. In accordance with the principles of the present invention, photography in this range of illumination is made possible by concentrating light from the scene. In this regard, each of the micro-lenses 42 in array 40 fractures light from the scene into at least two portions. As is shown in FIG. 1, a concentrated fraction 44 of light from scene 24 is concentrated so that a greater amount of light per unit area falls upon each of the concentrated image areas 48 of photosensitive element 30 during an exposure than would fall upon concentrated image areas 48 in the absence of the array 40 of micro-lenses 42. As is shown in FIG. 2b, this increase in the amount of light incident upon concentrated image areas 48 has the effect of shifting a first range 84 of scene exposure levels so that the entire first range 84 is within actual film latitude 72 allowing a pattern of concentrated image elements 52 to form a contrast image in the concentrated image areas 48 of photosensitive element 30.

Incidentally, some of the light incident on micro-lenses 42, for example light that is poorly focused by micro-lenses 42 or light that passes between distinct ones of micro-lenses 42, is not concentrated. Instead, this residual fraction 46 of the light passes to photosensitive element 30 and is incident on residual image area 50 enabling formation of a residual image 54. Residual image 54 can further be formed by designed or adventitious light scatter and reflection in photosensitive element 20. This residual fraction of light 46 is less than the amount of light that would be incident on photosensitive element 30 in the event that array 40 of micro-lenses 42 was not interposed between the scene 24 and the photosensitive element 30 during the same exposure. Thus, micro-lenses 42 effectively filter light from the scene that is incident on residual image area 50 so that a greater quantity of light must be available during the exposure in order for a residual image 54 to be formed on photosensitive element 30. Accordingly, the predefined period of time that shutter system 27 permits for exposure of photosensitive element 30 is sufficient to form an image on the residual image area 50 of the photosensitive element when light from the scene is within a second range.

Figure 2C:
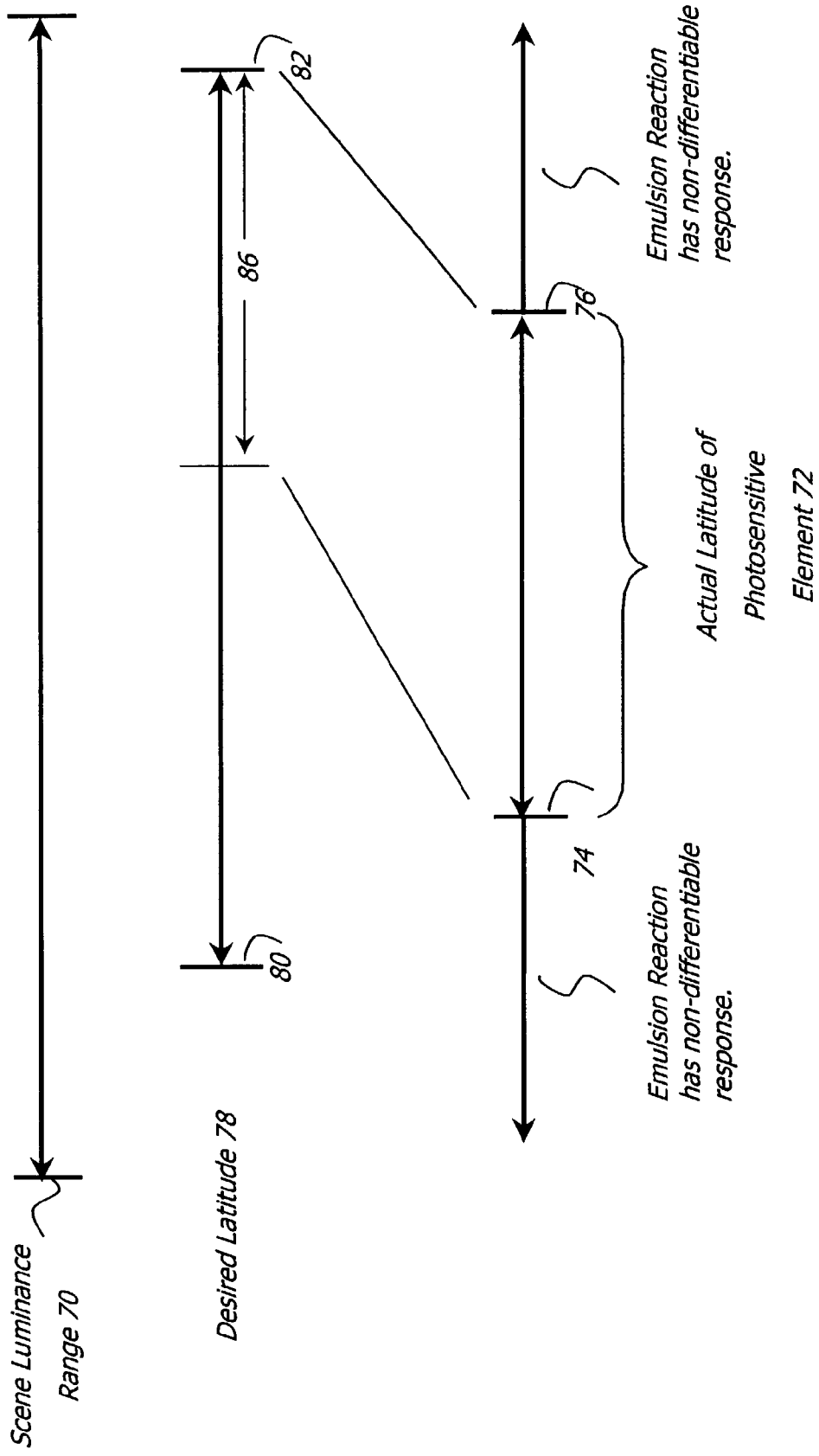
FIG. 2c is a diagram useful in describing the effect of residual light on the photosensitive element.

Accordingly, as is shown in FIG. 2c, when the micro-lenses 42 of array 40 are exposed to light within a second exposure range 86, a second exposure suitable for producing an image over the range indicated by second image range 86 is formed on photosensitive element 30 in the residual image area 50. In this way, photosensitive element 30 can be used to record differentiable images at exposure levels that are above the upper response threshold 76 of photosensitive element 30 but below upper response threshold 82.

A region of overlap can be defined between first exposure range 84 and second exposure range 86. Where it is desired to greatly increase system latitude 78 of the photosensitive element 30, this region of overlap can be contracted. In one embodiment, the ability to capture image information from either of the concentrated image elements 52 or residual image 54 over a continuous system latitude 78 is ensured by defining a substantial range of exposures wherein first exposure range 84 and second exposure range 86 overlap. Alternatively, it may be preferred to provide a camera 20 wherein there is substantial separation between first exposure range 84 and second exposure range 86. Camera 20 having such a substantial separation would effectively operate to capture different images under very different imaging conditions such as daylight and interior light.

It will be appreciated that when an exposure level is in the second exposure range 86, concentrated image elements 52 are formed on element 30. The concentrated image elements 52 formed during exposure in the second exposure range 86 can contain useful imaging information where the first exposure range 84 and second exposure range 86 at least partially overlap. However, where the exposure is above the first exposure range 84 then the concentrated image elements 52 will appear as over exposed artifacts in the image formed in the residual image area 50.

It will be further appreciated that while this discussion has been framed in terms of a specific embodiment directed towards silver halide photography intended for capturing human visible scenes the invention can be readily applied to capture extended scene luminance ranges and spectral regions invisible to humans and the light sensitive material can be any light sensitive material known to the art that has the requisite imaging characteristics. The effective increase in latitude enabled can be at least 0.15 log E. In certain embodiments, the effective increase in latitude can be between at least 0.3 log E and 0.6 log E. Preferably, the effective increase in latitude is at least 0.9 log E.

Forming an Image Using Concentrated Image Elements

Figure 3:
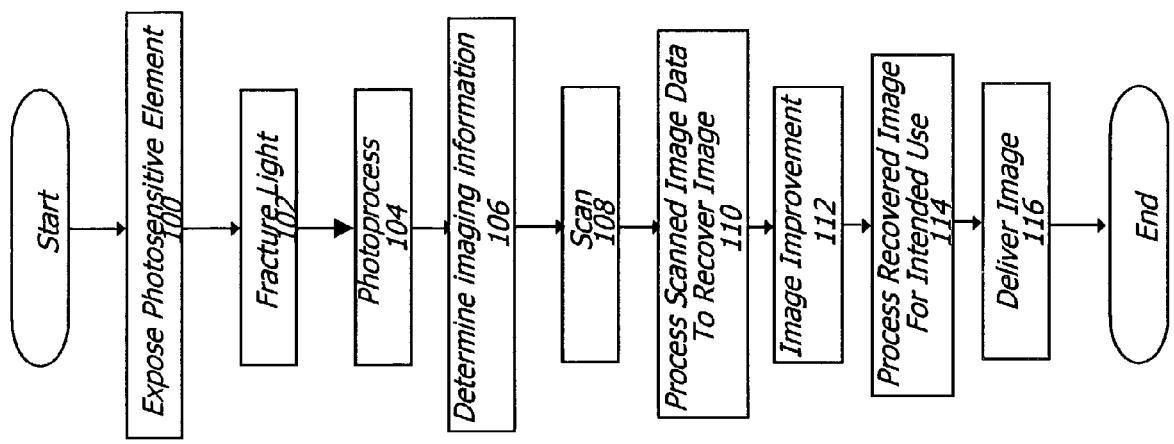
FIG. 3 shows a flow diagram of one embodiment of a method of producing an image according to the invention.

FIG. 3 shows a flow diagram of one embodiment of a method for using a photosensitive element 30 having a fixed exposure range to capture image information from scenes having a different exposure ranges and for recovering an acceptable output image from the imaging information recorded on the photosensitive element 30. The first step in this process is that of exposing the photosensitive element to light from a scene. (step 100).

The light is fractured into a pattern of concentrated fractions and residual fractions. (step 102) As described above, the concentrated fractions of the light form a pattern of concentrated imaging elements 52 such as lines or dots on photosensitive element 30 after development. When the light from the scene is within first exposure range 84 a contrast image is formed in the concentrated image elements 52. As is also described above, the residual fractions of the light expose a residual image area 50 of the photosensitive element 30. When light from the scene is within second exposure range 86, a contrast image is formed on the photosensitive element 30. Preferably, the first exposure range 84 and second exposure range 86 together are greater than the latitude of the photosensitive element 30.

The photosensitive element 30 is then photoprocessed (step 104). Any art known for photoprocessing can be employed. The photoprocessing can comprise a development step with optional desilvering steps. The photoprocessing can be done by contacting the photosensitive element with photoprocessing chemicals or known agents enabling photoprocessing. The photoprocessing can be done by contacting the photosensitive element 30 with aqueous solutions of photoprocessing chemicals or pH adjusting agents or both. Alternatively, the photosensitive element can be photoprocessed using an art known as photothermographic processing wherein the photosensitive element 30 is photoprocessed by heating or by a combination of contacting with photoprocessing enabling agents and heat. As a result of photoprocessing (step 104) photosensitive element 30 becomes a photoprocessed element 38 having at least one image wise contrast image recorded thereon.

Photoprocessed element 38 is scanned (step 108) and the scanned image is processed (step 110) to recover an output image based upon image data from either or both of the concentrated image areas 44 or the residual image areas 50. It will be appreciated that the scanning and processing steps can be expedited where it is known whether photoprocessed element 38 contains imaging information in the first area only or in both the first and second areas. Thus in the embodiment of FIG. 3, the step of determining where imaging information can be found (step 106) is performed before scanning (step 108). The output image is optionally further improved (block 112) and processed for its intended use (step 114). The output image is then delivered. (step 116)

Figure 4:
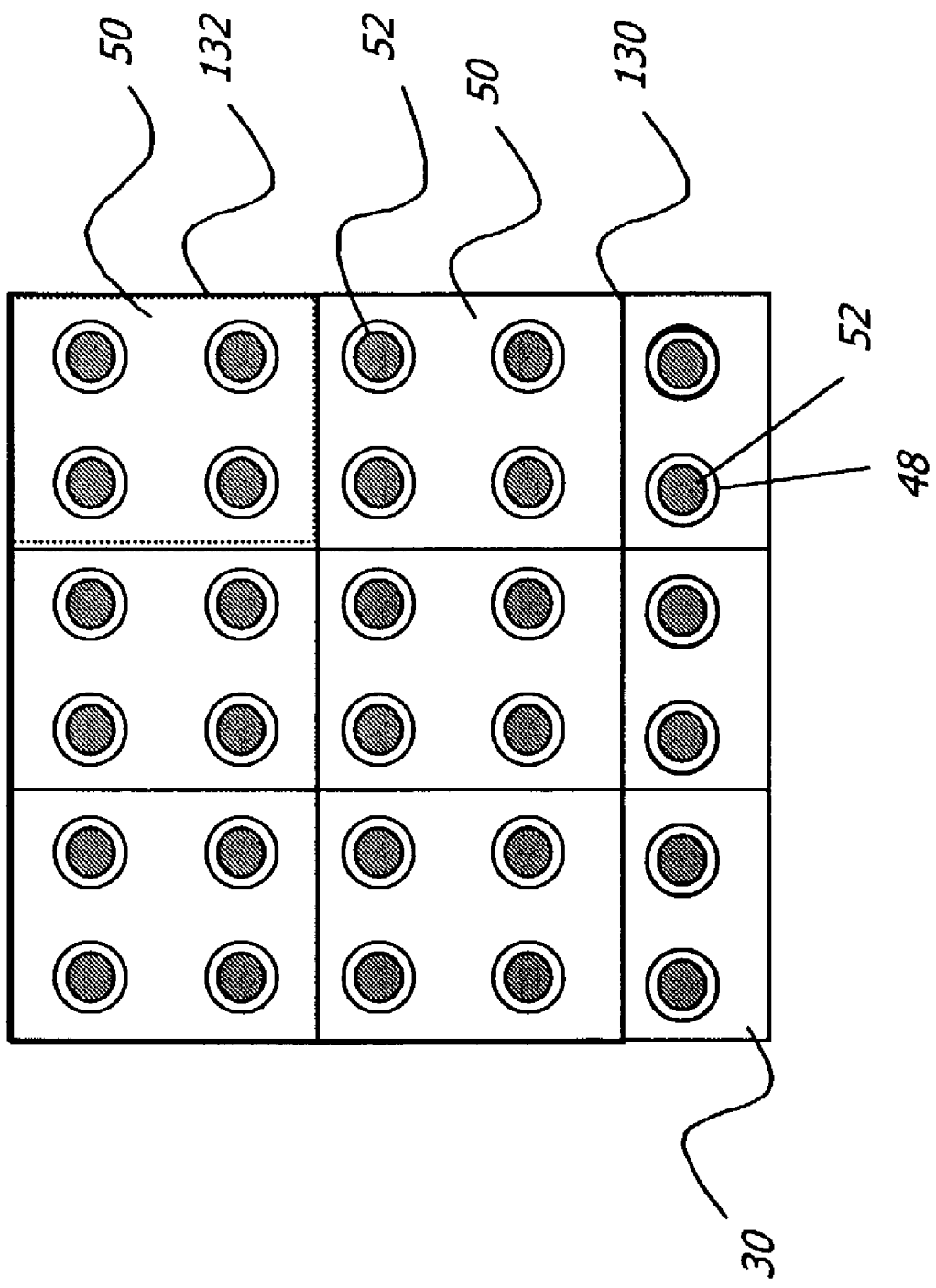
FIG. 4 shows an image pattern formed on photosensitive element after exposure by camera according to the invention.

Referring again to FIG. 4 what is shown is an image pattern formed on a photoprocessed element 38 after the steps of exposure (step 100) fracture (step 102) and photoprocessing (step 104) have been performed. The image pattern formed on photoprocessed element 38 represents an image pattern that is formed when the scene has a range of exposure levels that is within the first exposure range 84 but lower than the second exposure range 86. Accordingly, on the photoprocessed element 38 shown in FIG. 4, exposure forms a pattern of concentrated image elements 52 while no exposure occurs in the residual image area 50. As is shown in FIG. 4, concentrated image areas 48 have a dot shaped concentrated image element 52. Each dot shaped concentrated image element 52 has a density that is related to original scene exposure. Accordingly, an image of the scene can be derived from contrast differences between the dot shaped concentrated image element 52.

In the embodiment of FIGS. 1-3, the pattern of dot shaped concentrated image element 52 are formed by passing light from scene 24 through a micro-lens array 40 comprising a cubic, close packed lenticular array of circular micro-lenses 42. This arrangement results in the dot pattern shown in FIG. 4. In this embodiment, micro-lenses 42 can have a uniform cross-sectional area. FIG. 5a shows, conceptually, a micro-lens array 40, of micro-lenses 42 arranged in a uniform cubic close packed distribution pattern by a support 90. It will be appreciated that other array patterns can be used. For example, FIG. 5b shows an embodiment having an off-set square close packed array pattern. In another embodiment shown in FIG. 5c micro-lenses 42 are arranged in micro-lens array 40 having a hexagonal close packed array pattern. Micro-lens array 40 can also feature random distributions of micro-lenses 42. One embodiment of an array having a random distribution is shown in FIG. 5d. As is shown in FIG. 5e, in still another embodiment, micro-lens array 40 can comprise an array of cylindrical or acylindrical micro-lenses 42.

Figure 6A:
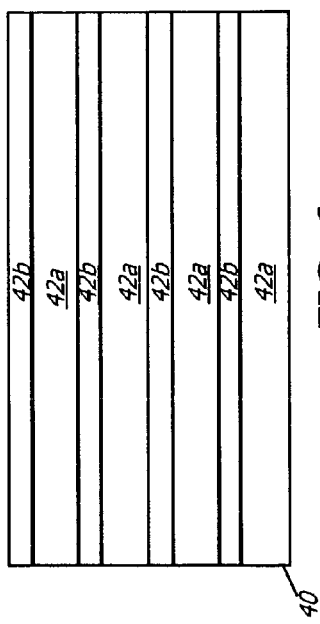
FIGS. 6a-6c show diagrams illustrating various embodiments of arrays of different micro-lenses that can be usefully combined in a single array of micro-lenses.
Figure 6B:
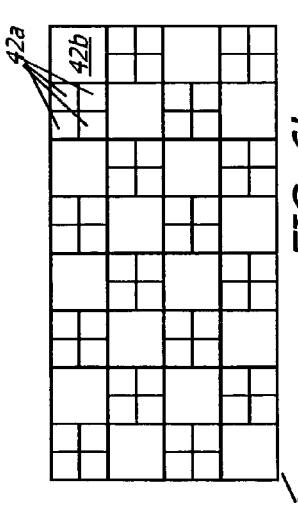
Figure 6C:
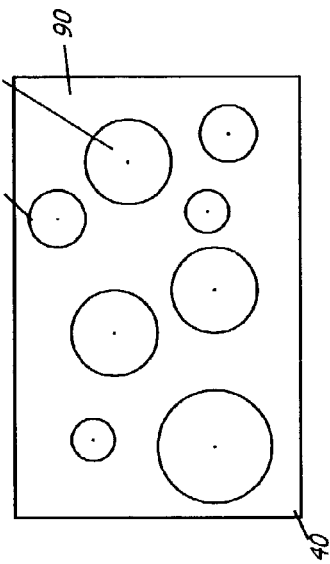
Figure 6D:
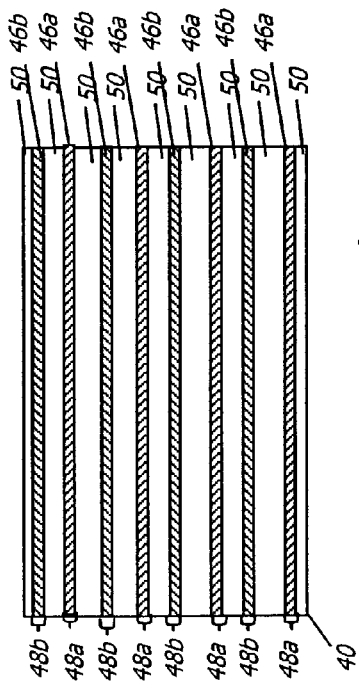
FIGS. 6d-6f show diagrams illustrating patterns recorded on a photosensitive element by imagewise exposure of the photosensitive element to light from a scene passing through, respectively, the arrays of FIGS. 6a-6c.
Figure 6E:
Figure 6F:
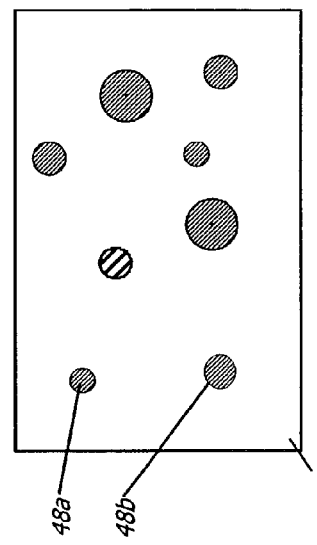

As is shown in FIGS. 6a, 6b and 6c, micro-lens array 40 can comprise micro-lenses 42 having different optical characteristics. In the embodiment of FIG. 6a, a micro-lens array 40 of cylindrical micro-lenses 42 is shown. As is shown in FIG. 6a, micro-lens array 40 has a first set of micro-lenses 42a that have a greater cross-section area than a second set of micro-lenses 42b also provided by micro-lens array 40. In this embodiment, the first set of micro-lenses 42a concentrate a greater portion of light during an exposure than micro-lenses 42b. Thus, the first set of micro-lenses 42a form a line image on photosensitive element 30 as shown in FIG. 6d, in a first set of concentrated image areas 48a, when the amount of the light during the exposure is within a first exposure range 84. When a light from the scene within a second exposure range 86, the second set of micro-lens array 42b form a line image on photosensitive element 30 in a second set of concentrated image areas 48b. Light that is not concentrated by either set of micro-lenses 42a and 42b can form a residual image (not shown) in residual image area 50 of photosensitive element 30 of FIG. 6d. Similarly, FIGS. 6b and 6c each show the use of a micro-lens array 40 having differently sized sets of micro-lenses 42a and 42b with the micro-lens array 40a concentrating light to form an exposure and directing that light onto concentrated image areas 48a on photosensitive element 30 when light from scene 24 is within a first range. Micro-lenses 40b concentrate light from a scene and direct this light onto concentrated image areas 48b on photosensitive element 30 to form an exposure when the light from the scene is within a second range. Here too, residual portions of the light are recorded in residual image areas 50 of photosensitive element 30. Thus, in these embodiments of FIGS. 6a-6c, the effective latitude of the photosensitive element 30 can be further extended.

As is shown in FIG. 6c, the surface coverage of micro-lenses 40 does not have to be maximized. While any useful surface coverage of micro-lenses 40 can be employed, the ratio of the projected area of the micro-lenses 40 to the projected area of the photographic or photosensitive element 30, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of exposure latitude while maintaining useful photographic graininess and sharpness. In any embodiment where the surface coverage is less than the close packed limit, support 90 can be defined to allow residual light to strike photosensitive element 30.

Micro-lens array 40 can comprise a set of individual micro-lenses 42 that are formed together or joined together, for example by extrusion, injection molding and other conventional fabrication techniques known to those in the art. Micro-lens array 40 can also be formed by combining a plurality of separate micro-lenses 42 fixed together by mechanical or chemical means or by mounting on support 90. Micro-lens array 40 can comprise a set of lenticular beads or spheres (not shown) that are positioned proximate to or coated onto photosensitive element 30 or otherwise joined to photosensitive element 30. The micro-lenses 42 may be formed in any matter known in the microstructure art. These micro-lenses 42 may be unitary with photosensitive element 30, as for example by being embossed directly into photosensitive element 30 at manufacture or they may be integral to a distinct layer applied to photosensitive element 30. In still other embodiments, a micro-lens array 40 can be formed using a photosensitive coating.

Figure 7A:
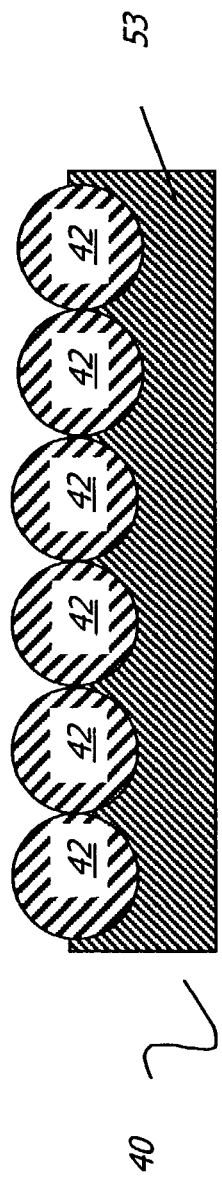
FIGS. 7a-7c show cross-section illustrations of arrays of micro-lenses, spherical and aspherical lenses.
Figure 7B:
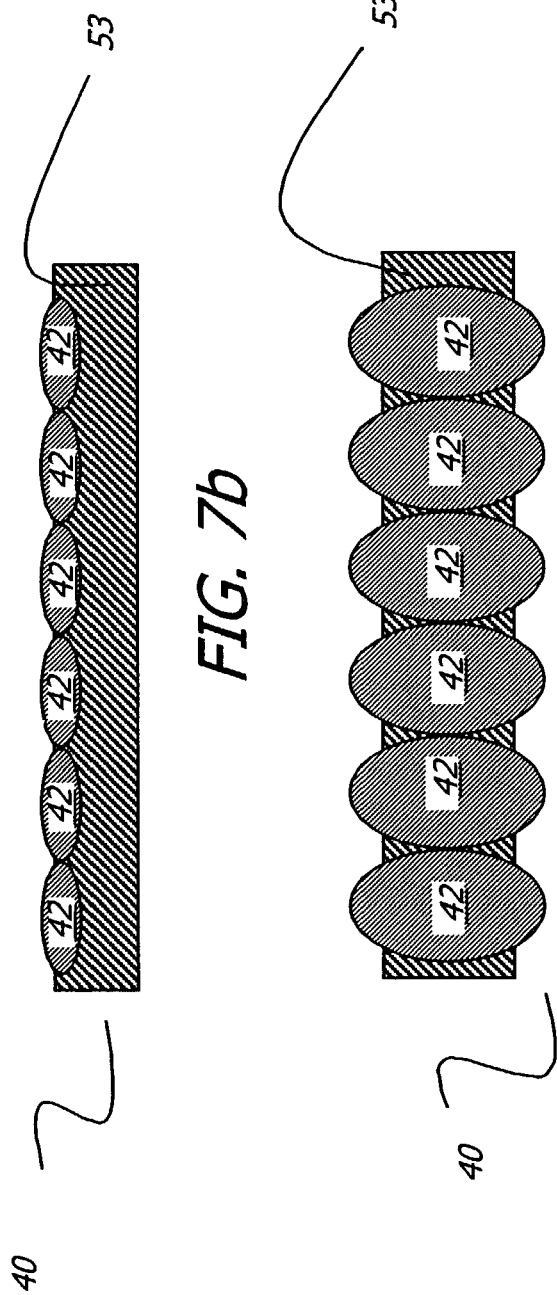
Figure 7C:
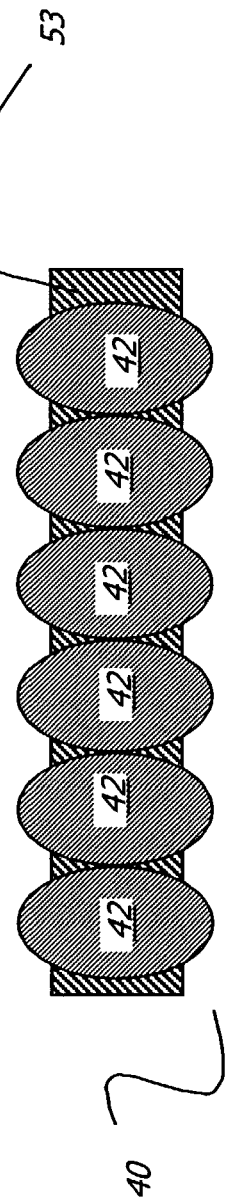

FIGS. 7a-7d shows a cross-sectional view of micro-lenses 42 mounted in a support 90 and exhibiting example embodiments of various spherical and aspherical micro-lenses 42. FIG. 7a shows an embodiment wherein micro-lenses 42 comprise spherical lenses joined by support 90. FIGS. 7b and 7c show embodiments of micro-lens array 40 having spherical micro-lenses 42. It is appreciated that any of the above described array patterns may be combined with aspherical micro-lenses 42 to provide extended latitude. Further, any of the patterns of micro-lenses 42 can be applied in a non-close packed manner to enable extended photographic latitude.

Micro-lenses 42 are shown with distinct hatching to illustrate the spherical and aspherical character of the protruding portion that actually forms the micro-lens. Aspherical micro-lenses 42, of the type shown in FIGS. 7b and 7c, are especially useful for this application in that the variable radius of such lenses allows for control of the lens focal length and lens aperture nearly independently of the spacing between the micro-lenses and the light sensitive layers. While these cross-sections have been described as spherical or aspherical, it is fully appreciated that the diagrams equally represent in cross-section cylindrical or acylindrical micro-lenses 42.

The light concentration or useful photographic speed gain on concentrating light focused by taking lens system 22 with a circular projection micro-lens 42 is the square of the ratio f-numbers of the camera 20 and the micro-lenses 42. Speed gain (in log relative Exposure) in such a system can be determined as the speed gain equals 2×log (camera lens f-numbers/micro-lens f-numbers). The light concentration or useful photographic speed gain of cylindrical micro-lenses allow the square root of such an improvement because they concentrate light in only one direction. The concentration of light by micro-lens array 40 enables both a system speed gain and forms an exposure pattern on the light sensitive material.

The dimensions of camera 20 and the detailed characteristics of the taking lens system 22 dictate the exposure pupil to image distance, i.e. the camera focal length. Preferably, image 24' is formed at the micro-lens array 40 of micro-lenses 42. The characteristics of micro-lenses 40 dictate their focal length. The micro-lens images are formed at the light sensitive layers of photosensitive element 30. The f-number of taking lens system 22 controls the depth-of-focus and depth-of-field of camera 20 while the micro-lens f-number controls the effective aperture of camera 20. By using a taking lens system 20 having a stopped down f-number, excellent sharpness along with wide depth of focus and depth of field are obtained. By using an opened f-number for micro-lens array 40, high system speed is obtained with emulsions that are typically thought of as "slow." This extra speed allows available light photography without the thermal and radiation instability typically associated with "fast" emulsions.

Accordingly, a useful combination of taking lens system 22 and micro-lenses 42 f-numbers will be those that enable system speed gains. System speed gains of more than 0.15 log E, or ½-stop, are useful, while system speed gains 0.5 log E or more are preferred. While any micro-lenses 42 having an f-number that enables a speed gain with a camera taking lens 22 having adequate depth-of-field for an intended purpose can be gainfully employed, typically micro-lenses 42 having f-numbers of 1.5 to 16 are useful. In certain embodiments, micro-lenses 42 having f-numbers in the range of f/2 to f/7 are useful. In other embodiments, micro-lenses 42 having f-numbers in the range of f/3 to f/6 are preferred.

The individual micro-lenses are convergent lenses in that they are shaped so as to cause light to converge or be focused. As such, they form convex projections from the film base. The individual projections are shaped as portions of perfect or imperfect spheres. Accordingly, the micro-lenses can be spherical portion lenses or they can be aspherical portion lenses or both types of micro-lenses can be simultaneously employed. A spherical portion micro-lens has the shape and cross-section of a portion of a sphere. An aspherical portion micro-lens has a shape and cross-section of a flattened or elongated sphere. The lenses are micro in the sense that they have a circular or nearly circular projection with a diameter of between 1 and 1000 microns. A cylindrical portion micro-lens has the shape and cross-section of a portion of a cylinder. An acylindrical portion micro-lens has a shape and cross-section of a flattened or elongated cylinder.

Preferred design parameters for micro-lenses 42 and their relationship to the light sensitive layers of a photosensitive element 30 follow from these definitions:

Micro-lens radius is the radius of curvature of the hemispheric protrusion of micro-lenses 42. For aspherical micro-lenses 42 this value varies across the surface of the micro-lens.

Micro-lens aperture is the cross sectional area formed by the micro-lens typically described as a diameter. For spherical micro-lenses this diameter is perforce less than or equal to twice the micro-lens radius. For aspherical micro-lenses this diameter can be greater than twice the smallest radius encountered in the micro-lens. Use of differently sized micro-lenses having distinct apertures enables distinct levels of speed gain on a micro-scale and thus enables extended exposure latitude for a photographic layer.

Micro-lens focal length is the distance from micro-lenses 42 to photosensitive layers of photosensitive element 30. For micro-lenses 42 on the opposing side of a support relative to a light sensitive layer this is typically set to be about the thickness of the support. It is appreciated that use of micro-lenses enables distinct color records to be preferentially enhanced for sensitivity. This feature can be especially important in specific unbalanced lighting situations such as dim incandescent lighted interiors that are blue light poor and red light rich. For example, with systems intended for incandescent photography the micro-lenses can be focused on the film's blue sensitive layers thus providing a preferential speed boost to the color record and improved color balance. In other situations, other colors can be preferentially boosted.

Micro-lens f-number is the micro-lenses 42 aperture divided by the micro-lens focal-length. For spherical micro-lenses 42, the desired micro-lens focal length can be used to define an appropriate micro-lens radius following a lens equation, thusly:

Micro-lens radius is the micro-lens focal-length times $(n_2-n_1)/n_2$; where $n_1$ is the refractive index of the material outside the micro-lens (typically air with a refractive index of unity) while $n_2$ is the refractive index of the micro-lens and any contiguous transmissive material e.g. (plastics as used in array support 90.) Photographically useful gelatin typically has a refractive index of 1.4 to 1.6). The ratio of the highest to the lowest refractive index can be between 0.8 and 1.2. In preferred embodiments the ratio is between 0.95 and 1.05. Following the known refractive indices of typical photographic system components, useful spherical micro-lenses will have a micro-lens focal length about 3 times the micro-lens radius $((n_2-n_1)/n_2 \sim 1/3)$. Non-integral micro-lenses 42 can be made from a wider variety of plastics and glasses. For micro-lenses 42 that are integrally formed on photosensitive element 30, superior optical properties are provided when the refractive index of the materials used to form a micro-lens, the photographic support and the vehicle for the light sensitive layers are as similar as possible.

Accordingly, micro-lenses 42 formed on a flexible photographic substrate 34 suitable for use in roll type photosensitive element 30 and located on the opposing side of the support from light sensitive layers will have a useful radius defined by the thickness of substrate 34. Preferred flexible substrates 34 are between about 60 and 180 microns thick. In this context, it is appreciated that aspherical micro-lenses 42 enable a greater degree of design flexibility in adjusting micro-lens aperture and focal length to the other requirements of photographic supports. In an alternative embodiment, shorter focal length micro-lenses 42 can be employed on the emulsion side of the supports where the micro-lenses 42 are located on the same side of a supports as the light sensitive layers and further from the support than the light sensitive layers. The desired focal length here would then be dictated by the thickness of any intervening layers. When there are intervening layers, they can be on the order of 1 to 50 microns or more in thickness. In the embodiment of FIG. 1, the micro-lens array 40 of micro-lenses 42 is separate from photosensitive element 30 and is separately mounted in camera 20 between camera taking lens system 22 and gate 26. In this embodiment, the focal length is dictated by the differences in refractive index between the micro-lens material and the surrounding medium, typically air and the micro-lens radius of curvature. Additional details can be found in the cross-referenced, co-filed and commonly assigned, U.S. patent applications Ser. No. 10/170,607, U.S. patent application Ser. No. 10/171,012, U.S. patent application Ser. No. 10/167,746, entitled and U.S. patent application Ser. No. 10/167,794.

While any useful number of micro-lenses 42 can be employed per image frame to achieve the desired results, it is recognized that the actual number to be employed in any specific configuration depends on the configuration. For example, when a desired micro-lens focal length is fixed by forming integral micro-lenses 42 on the support side of a photographic material and the micro-lens f-number is fixed by the desired system speed gain for the combined lens system, micro-lens apertures or pitches of 10 to 100 microns can be encountered. So, a 135-format frame, roughly 24 by 36 mm in extent, can have between about 86 thousand and 8.6 million micro-lenses at full surface coverage. Emulsion side micro-lenses, with their shorter focal-length can have useful apertures or pitches between about 3 and 30 microns which means roughly 960 thousand to 96 million micro-lenses 42 per 135-format frame at full surface coverage. Camera mounted micro-lenses 42 with their greater freedom in focal lengths can range up to 500 microns or even larger in aperture or pitch.

Light from the scene can be passed through more than one array of micro-lenses 40. For example, light from the scene can be passed through a first micro-lens array having hemi-cylindrical micro-lenses arrayed along a horizontal axis and then passing this compressed light through a second micro-lens array having hem-cylindrical micro-lenses arrayed along a vertical axis. This technique can be usefully employed to cause bi-axial concentration of the light from the scene.

Image Recovery Process

Referring again to FIG. 3, it will be recalled that after photofinishing, photosensitive element 30 contains either image information in a first enhanced image recorded in the form of darkened line or dot artifacts creating a half-tone appearance as described above or as a residual image 54 having darkened artifacts throughout. In the embodiment shown in FIG. 3, the first step in the process of recovering a useful image from a photosensitive element 30 having a fractured light image is to determine whether photosensitive element 30 contains an image formed from a contrast pattern recorded in the concentrated image area 48 or the residual image area 50 or both. (step 106). The steps of scanning (step 108) processing the scanned image data to recover image (110) and processing the scanned image to form an improved image (step 112) processing the image for its intended use (step 114) and delivering the image (step 116) are then performed. These processes will now be described in detail with reference to FIG. 8 which shows one embodiment of a reproduction system 140 that can be used to extract useful images from photosensitive element 30 bearing an image formed by concentrated image elements 52 and/or a residual image 54.

Figure 8:
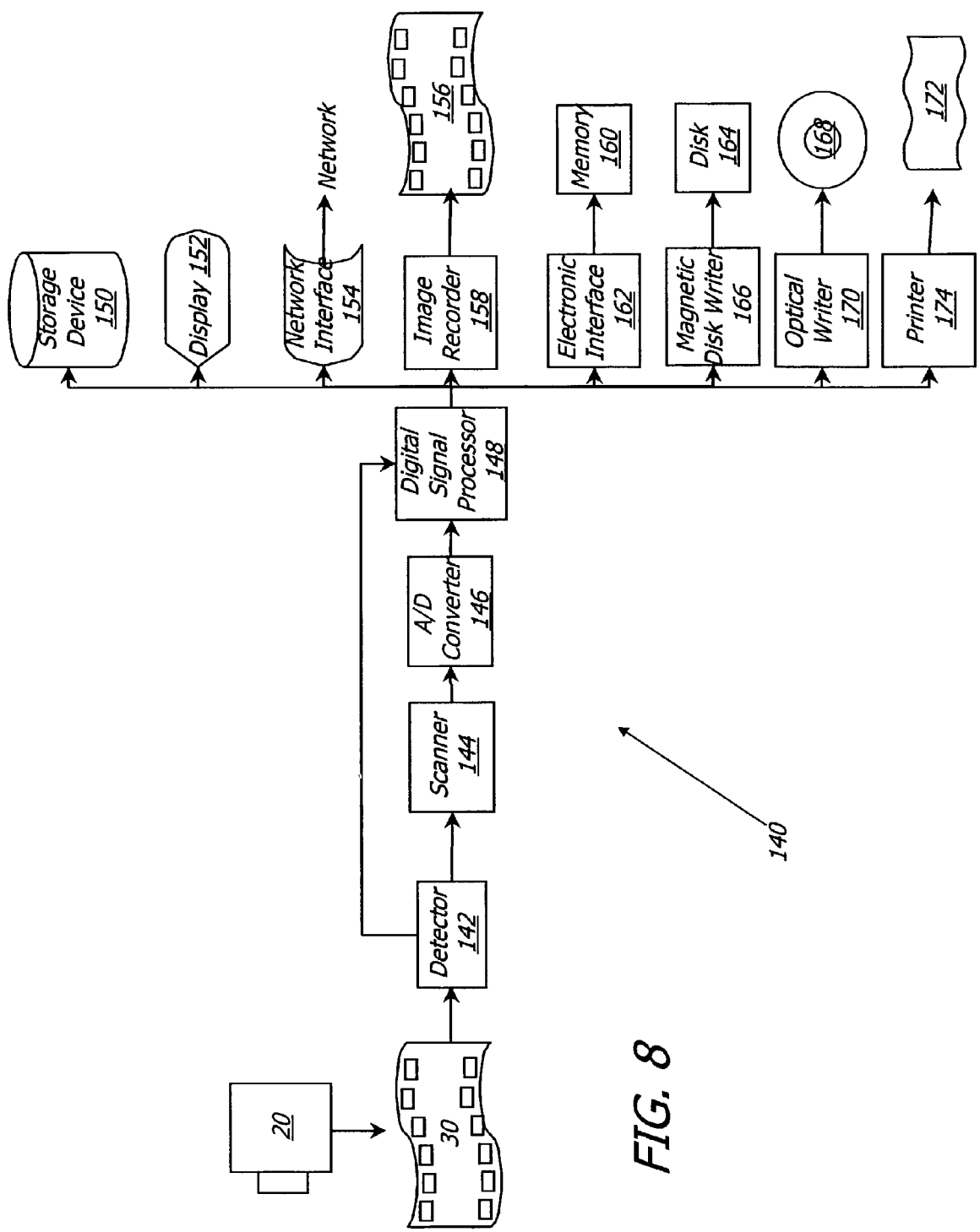
FIG. 8 shows one embodiment of a reproduction system according to the invention.

As is shown in FIG. 8, reproduction system 140 comprises an optional detector 142. Detector 142 is used to detect signals indicating the type of image that is recorded on photosensitive element 30.

An image scanner 144, is used to scan photosensitive element 30. Photosensitive element 30 is scanned, for example, on a pixel by pixel basis using an array detector (not shown) such as an array charge-coupled device (CCD). Alternatively, photosensitive element 30 can be scanned on a line-by-line basis using a linear array detector (not shown) such as a linear array CCD. Other types of conventional scanning methods and devices can be used. For pictorial imaging, a sequence of R, G, and B picture element signals are generated that can be correlated with spatial location information provided from scanner 144. Where necessary, this information is placed in digital form by an A/D converter 146. Signal intensity and location information is fed into digital signal processor 148, processed, and then placed in a digital form for storage in a storage device 150 such as disk drive, presented on a display 152, delivered using an electronic network such as a telecommunication system or the internet by way of a network interface 154; recorded on a photosensitive element 158 using an photosensitive element image recorder 156; stored on an electronic memory 160 such as a compact flash card or other portable electronic image storage device by an electronic data recorder 162; stored on a magnetic disk 164 by a disk drive 166 or recorded on an optical recording medium 168 such as a Digital Video Disk, Compact Disk, or other optical recording medium by an optical writer 170; or printed on a receiver media 172 including but not limited to paper, fabric, or tangible object by a printer 174 such as a laser printer, ink jet printer, thermal transfer printer or other similar device.

Referring now to FIGS. 1-8, the process of recovering an acceptable image from a photoprocessed element 38 will now be described in detail. As noted above, the first step in this process is the step of determining whether imaging information is recorded on photoprocessed element 38 in the concentrated image areas 48 or residual image area 50. (step 106)

In the embodiment shown in FIG. 8 the determining (step 106) is made by detector 142 before photoprocessed element 38 is optically scanned. In this regard, detector 142 is adapted to detect signals that are encoded on photosensitive element 30 or on an electronic memory 160 associated with photosensitive element 30. These signals indicate whether the type of image that is contained on photosensitive element 30 is in the form of a pattern of concentrated image elements 52 or in the form of a residual image 54 or both. This determination can be made by detecting signals that are optically, magnetically, or mechanically recorded on photosensitive element 30 by, for example, communication head 66 of camera 20 or by detecting encoded signals recorded on an electronic memory that is associated with photosensitive element 30 by, for example, communication head 66 of camera 20. This determination can also be made by a user designation during the photofinishing process. In such an embodiment, detector 142 can comprise a manual input such as a switch or keyboard. By making this determination in advance of scanning, it is possible to adapt the scanning process to a mode that is best suited for recovering an acceptable image from the image that is recorded on photosensitive element 30.

Advantageously such signals can be recorded on photosensitive element 30 by camera 20 as is shown in FIG. 1. Camera 20 is shown having an optional light sensor 60, controller 62, photosensitive element type sensor 64 and communication head 66. These optional components can be used to detect whether there is sufficient light from the scene to form residual image 52 on photosensitive element 30 and to encode a signal on photosensitive element 30 indicating whether photosensitive element 30 contains an image information from a first exposure range 84, a second exposure range 84 or both. In this regard, light sensor 60 can comprise, for example, a photovoltaic cell that generates a voltage output that is proportional to the light from the scene. Controller 62 detects this signal and determines scene brightness based upon this signal. Controller 62 can be of a digital controller such as a microprocessor or micro-controller or analog controller such as a programmable analog device. Where controller 35 is of the digital type an analog/digital converter (not shown) may be interposed between the light sensor 60 and controller 62 to convert the voltage output into a digital form. Photosensitive element type sensor 64 generates a signal representative of the photosensitive element type that is loaded in camera 20. Photosensitive element type sensor 64 can comprise a DX or optical bar code reading apparatus for directly reading photosensitive element type markings or other signals indicative of photosensitive element type from a photosensitive element 30 or photosensitive element canister (not shown). Photosensitive element type sensor 64 can also comprise a switch or other setting device allowing a user to designate the type of photosensitive element 36 that is loaded in camera 20. Where a photosensitive element type is marked on photosensitive element 30 an appropriate communication head 66 can be used as a photosensitive element type sensor 60.

Controller 62 receives a signal from photosensitive element type sensor 60 and determines whether the light from the scene will have sufficient illumination intensity to render a residual image 54 on photosensitive element 30. This determination based upon comparison of the scene brightness and the known first exposure range 84 of camera 20. Controller 62 then uses communication head 66 to encode a signal on photosensitive element 30 indicating the type of image that is recorded on photosensitive element 30. This signal can be optical, magnetic, mechanical or other type. In an alternative embodiment, photosensitive element 30 is associated with an electronic memory such as an integrated circuit memory (not shown). In this alternative embodiment, data regarding the type of photosensitive element 30 is recorded in the integrated circuit memory at the time of manufacture of photosensitive element 30 and extracted from photosensitive element 30 by communication head 64 that is adapted to communicate with such a memory. This communication can be conducted by optical, electronic, radio frequency or other convenient means. Data indicating image type is also recorded in the electronic memory in a similar fashion.

Signals can also be recorded on photosensitive element 30 by mechanical modifications to photosensitive element 30 or photosensitive element cartridge (not shown). In such embodiments, communication head 66 can cut, puncture or otherwise modify photosensitive element 30 or photosensitive element cartridge (not shown), to record signals and can also be adapted to detect such signals.

Alternatively, scanner 144 can be used to optically scan a photoprocessed element 38 to make the image type determination. Here the determination is made based upon detecting optical signals encoded on photosensitive element 30 by camera 20. These signals can be detected by optically scanning the photoprocessed element 38 that results from photoprocessing a photosensitive element 30 in a pre-scan process or using a normal scanning process. In a preferred embodiment, the determination is based upon the characteristics of the scanned image itself. In this embodiment, the image itself is scanned. The scanned image is examined to detect the characteristic dot or line pattern inherent in images formed according to the invention. The scanned image is further examined to detect either the presence or absence of a residual image 54 in the residual image area 50 of photosensitive element 30. The presence of an image in the residual image area 50 of photosensitive element 30 can be detected by examining the density level in the residual image area 50 and comparing this to the overall density level of the photoprocessed element 38.

Overall density level can be identified by a variety of techniques. The overall density of photoprocessed element 38 can be determined by scanning the photoprocessed element 38, averaging a statistically significant proportion of the film, and comparing that average to known density production in the photoprocessed element 38 after exposure and processing under a variety of controlled exposure conditions. An included calibration patch or chart as earlier described can be useful in this regard. In one alternative embodiment, the average density produced can be compared to values stored and accessible to the scanner associated CPU. In another alternative embodiment, the density of surround pixels can be determined and the presence or absence of meaningful signal deduced from that density. For a negative working photosensitive element, low densities under this test would correspond to low exposure conditions and high densities would correspond to a high exposure condition.

Alternatively, the densities in the concentrated image areas 48 can be compared to the maximum density capable of being formed in photoprocessed element 38 and an assessment of the overall exposure of photoprocessed element 38 drawn from that data. These comparisons can be done on a multiple, a full frame basis, or preferably on a partial frame basis. In another preferred embodiment, these comparisons can be done between the surround area and a known unexposed area of the photosensitive element such as the area between sprocket or metering holes on a conventional filmstrip or the area between image frames. In still another embodiment, the densities in residual image area 50 can be determined and compared. Where the relative densities of the surround area are greater than a predetermined average or where the frequency of the density of the surround area is greater than a predefined threshold, it can be determined that an image exists in the residual image area 50. The scanning can be done on a partial frame or full frame basis.

Where no residual image 54 is recorded in residual image area 50, the determination is made that the imaging information is recorded in the concentrated image areas 48 for example in a pattern of dot shaped concentrated image elements 52 of FIG. 4. Image information is recovered from dot shaped concentrated image elements 52 in a manner that is appropriate and processed accordingly as will be described presently. Where there is an exposure in residual image area 50, a determination is made that image information is contained at least in part in a residual image 54 and an output image is formed using the process described below. It is recognized that this latter embodiment is especially suited to inexpensive fixed focus cameras and particularly one-time-use cameras where it can be desirable to minimize ancillary camera functions for the sake of ergonomic issues such as size, shape and weight while at the same time minimizing costly features such as sensors, writers or flash units.

The scanning step (step 108) can be performed in any number of conventional manners using photosensitive element scanner 144. In one preferred embodiment, the image is scanned successively within blue, green, and red light within a single scanning beam that is divided and passed through blue, green and red filters to form separate scanning beams for each color record. If other colors are imagewise present in photosensitive element 30, then other appropriately colored light beams can be employed. Alternatively, when a monochromatic color forming material is employed, that material can be scanned and treated as such. As a matter of convenience, the ensuing discussion will focus on the treatment of color forming materials. In one embodiment, a red, green and blue light are used to retrieve imagewise recorded information and photosensitive element 30 is further scanned in infrared light for the purpose of recording the location of non-image imperfections. When such an imperfection or "noise" scan is employed, the signals corresponding to the imperfection can be employed to provide a software correction so as to render the imperfections less noticeable or totally non-noticeable in soft or hard copy form. The hardware, software and technique for achieving this type of imperfection reduction are described by U.S. Pat. No. 5,266,805 (Edgar) and WO 98/31142 (Edgar et al.), WO 98/34397 (Edgar et al.), WO 99/40729 (Edgar et al.) and WO 99/42954 (Edgar et al.).

In another embodiment, the formed image is scanned multiple times by a combination of transmission and reflection scans, optionally in infrared and the resultant files combined to produce a single file representative of the initial image. Such a procedure is described by U.S. Pat. Nos. 5,466,155, 5,519,510, 5,790,277; and 5,988,896 all in the name of Edgar et al.

In one embodiment, the scanning is performed at a spatial pitch that is coarser than the spatial pitch of the concentrated image areas 48 thereby under-sampling the fractured image. In another embodiment, the scanning is performed at a spatial pitch that is finer than the spatial pitch of the concentrated image areas 48 thereby over-sampling the fractured image. In yet another embodiment, scanning is performed at a spatial pitch that matches the spatial pitch of the concentrated image areas 48.

Image data is processed after scanning (step 108) to ensure the fidelity of color data in advance of the recovery of image information from concentrated image areas 48 or the residual image area 50. For example, specific techniques for transforming image-bearing signals after scanning are disclosed in U.S. Pat. No. 5,267,030 (Giorgianni et al.), U.S. Pat. No. 5,528,339 (Buhr et al.), U.S. Pat. No. 5,835,627 (Higgins et al.), U.S. Pat. No. 5,694,484 (Cottrell et al.), U.S. Pat. No. 5,962,205 (Arakawa et al.) and U.S. Pat. No. 6,271,940 B1 (Deschuytere et al.). Further illustrations of these procedures are provided by Giorgianni and Madden's *Digital Color Management*, Addison-Wesley, 1998. The signal transformation techniques disclosed can be further modified so as to deliver an image that incorporates the look selected by a customer. (references to be provided)

Matrices and look-up tables (LUTs) can provide useful image transformation. In one embodiment, three 1-dimensional look-up tables can be employed, one for each of a red, green, and blue color record. Due to the complexity of these transformations, it should be noted that the transformation can often be better accomplished by a 3-dimensional LUT. In another embodiment, a multi-dimensional look-up table can be employed, all as described in U.S. Pat. No. 4,941,039 (D'Errico).

In one variation, the R, G, and B image-bearing signals from scanner 144 are converted to an image metric which corresponds to that from a single reference image-recording device or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured RGB densities of that reference film, then for an input color negative film, the R, G, and B image-bearing signals from a scanner would be transformed to the R', G', and B' density values corresponding to those of an image which would have been formed by the reference color negative photosensitive element had it been exposed under the same conditions under which the actual color negative material was exposed.

In another variation, if the reference image recording medium was chosen to be a specific color negative film, and the intermediary image data metric was chosen to be the predetermined R', G', and B' intermediary densities of that reference film, then for an input color negative photosensitive element according to the invention, the R, G, and B image-bearing signals from a scanner would be transformed to the R', G', and B' intermediary density values corresponding to those of an image which would have been formed by the reference color negative photosensitive element had it been exposed under the same conditions under which the actual color negative recording material was exposed. The result of such scanning is digital image data that is representative of the image that has been captured on photosensitive element 30.

The next step in the recovery process is to recover image data from the scanned image data and to form an output image. (step 110) Various methods for processing this image data to recover image information from the scanned image data can be used. The selection of method can be based upon whether the image data is contained in the concentrated image area 48 in the residual image area 50 or both.

Recovery of Image Information from Exposure

Figure 9:
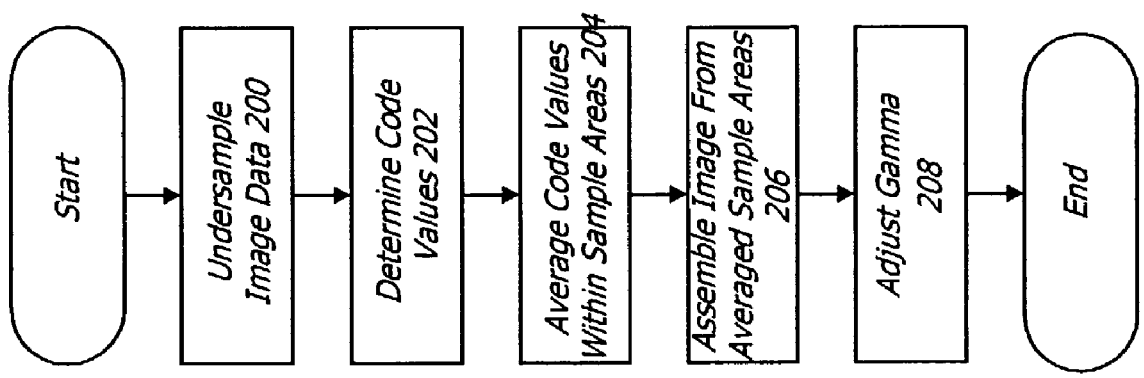
FIG. 9 shows an embodiment of an undersampling method according to the invention.

FIGS. 9-13 show embodiments of methods for processing the scanned image data to recover an image information from concentrated image elements 52. In particular, FIG. 9 shows an embodiment of an undersampling method. In the method of FIG. 9, an image is recovered from concentrated image elements 52 having for example dot shaped concentrated image areas as shown in FIG. 4. In this method, concentrated image areas 48 are undersampled by defining a sampling border within the image having a pitch that is wide enough to encompass more than one of the concentrated image areas 48. An example of such a sampling border is shown in FIG. 4. As is shown in FIG. 4, an undersampling border 130 is defined so that the pitch of the sampling border 130 defines a sample area 132 that generally encompasses four of concentrated image areas 48 and associated segments of second exposure area 50. (step 200) The code values within each sample area 132 are determined (step 202). The code values for each sample area are averaged to form a code value for use in forming an imaging picture element to be associated with the sample area 132. (step 204) A digital image is formed by assembling the code values. (step 206). This image can then be color corrected (step 208).

The undersampling of the captured image can be accomplished by using digital signal processor 148 to analyze the scanned image data and define an appropriate undersampling border 130 within the scanned image data. Where it is known that image information is recorded in concentrated image area 48 and before scanning (step 202), scanner 144 can be made to scan the image on photosensitive element 30 using a scanning pitch that encompasses more than one of concentrated image elements 52 in each sampling area 132. This undersamples the concentrated image elements 52 without requiring the digital signal processor 148 to effect the undersampling operation. An advantage of using undersampling is that exact alignment of the sampling border 130 with the pattern concentrated image elements 52 is not necessary.

It will be appreciated that undersampling also captures image data from residual image areas 48. Typically this image data will have a constant density associated with that of unexposed photosensitive element 30. Accordingly, it is possible to modify the color content and scene brightness to color correct the color content and brightness of each pixel to compensate for effect and therefore effectively remove artifacts from residual image area 50 from the output image. (step 208)

Figure 10:
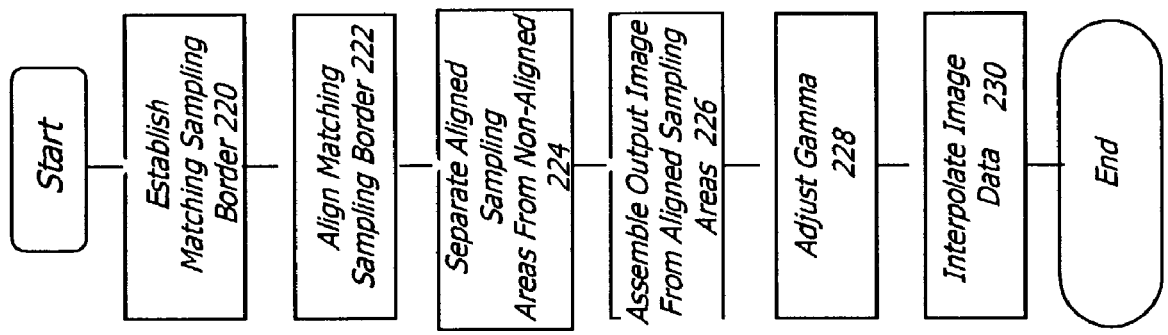
FIG. 10 shows a flow diagram of an embodiment of a matching sampling method for processing an image according to the invention.
Figure 11:
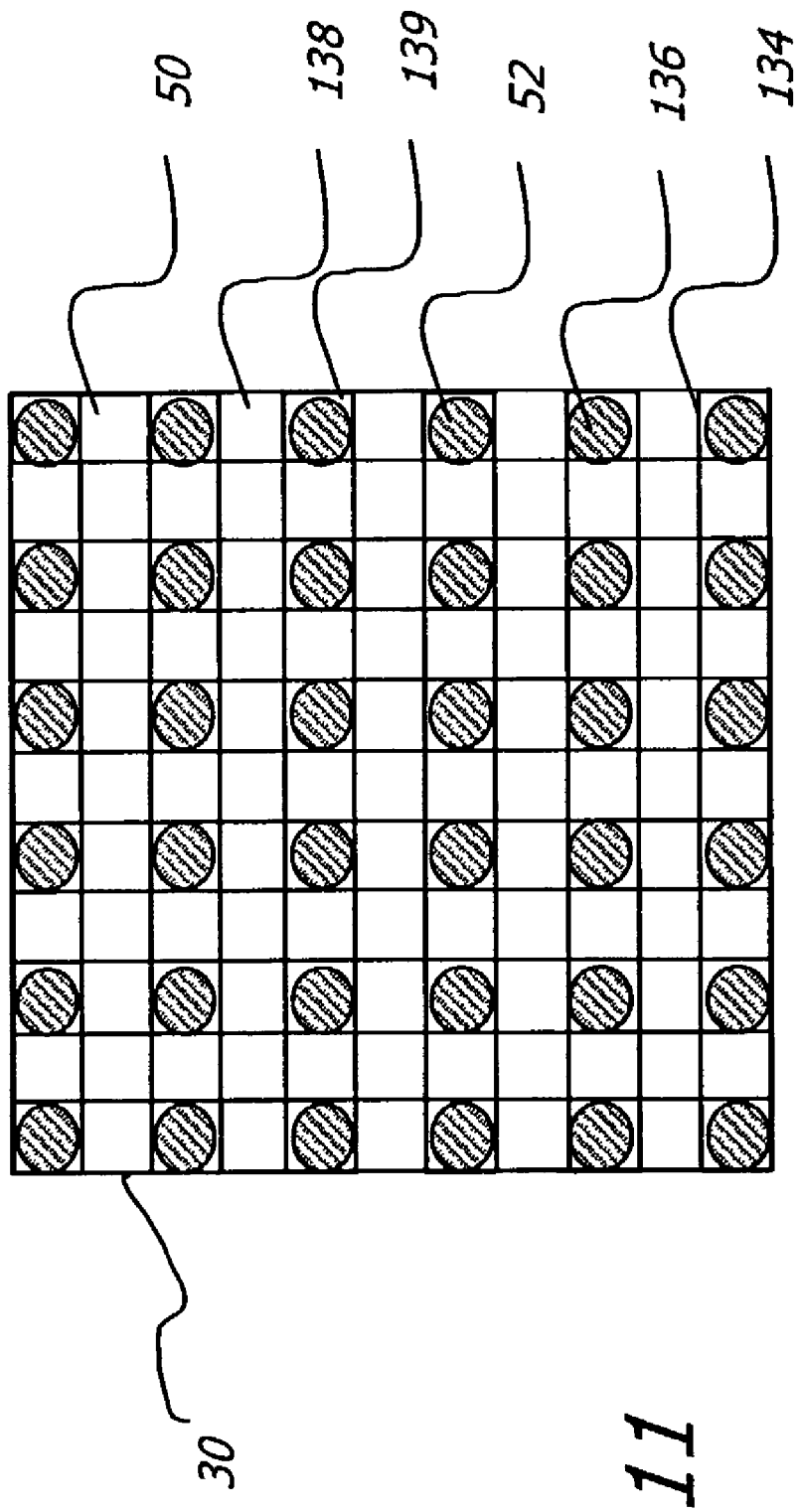
FIG. 11 illustrates an embodiment of matching sampling border aligned with dot encoded imaging information and usable with the embodiment of FIG. 10.

FIG. 10 shows a flow diagram of another embodiment of a method for processing an image to render an output image based upon imaging information recorded on concentrated image areas 48 for example from a photoprocessed element 38 bearing a pattern of concentrated image elements. As is shown in FIG. 11 in this embodiment, a matching sampling border 134 is established. (step 220). This matching sampling border 134 is aligned with the pattern information of concentrated image elements 52 (step 222). In one embodiment, the steps of establishing and aligning matching sampling border 134 are performed on the basis of prior knowledge of the optical characteristics of micro-lens array 40 and of the pattern of concentrated image elements 52. In another embodiment, these steps are performed on the basis of dynamically detecting contrast patterns in the concentrated image elements 52. In another embodiment, the pitch of concentrated image elements 52 is determined while photosensitive element 30 is within camera 20. In this embodiment, controller 62 can determine an anticipated pattern of concentrated image elements 52 based upon scene brightness, the characteristics of taking lens system 22 as detected by lens position detector 63, micro-lens array 40 and photosensitive element 30. Camera controller 62 causes communication head 66 to encode a signal that is an indication of the pattern of dot shaped concentrated image elements 52 onto photosensitive element 30 or a photosensitive element housing (not shown). In this embodiment, the pitch encoded signal is detected by detector 142 and communicated to scanner 144 or digital signal processor 148, which then adjusts the pitch of the matching sampling border 134.

When a distinct communication is employed, any communication scheme known in the art may be employed. Useful communication schemes include cartridge $D_x$ or $I_x$ codes, bar codes, on cartridge chips, photosensitive element optical characters, photosensitive element magnetics and such as disclosed in U.S. Pat. No. 6,222,607 B1 (Szajewski et al.), the disclosures of which are incorporated by reference. When the concentrated image pattern is communicated to a digital signal processor 64 or other controller, the scanned densities can be digitally filtered to identify the particular areas that have the communicated pattern. These areas are then tagged as concentrated image areas 48 and the remaining areas are tagged as residual image area 50.

After a matching sampling border 134 is established and aligned with the concentrated image elements 52, sampling areas 136 that are aligned with concentrated image elements 52 are separated from sampling areas 137 that are aligned with interdot areas 50. (step 224) Another image is then assembled from the sampling areas 136 that are aligned with the concentrated image elements 52. The image information from each sampling area 136 is then color or density corrected to remove the influence of any portion of the residual image area 50 contained within the sampling areas 136 (step 128). The optional step of interpolating image data for sampling areas 138 that are associated with interdot areas 50 can then be performed (step 130).

Figure 12:
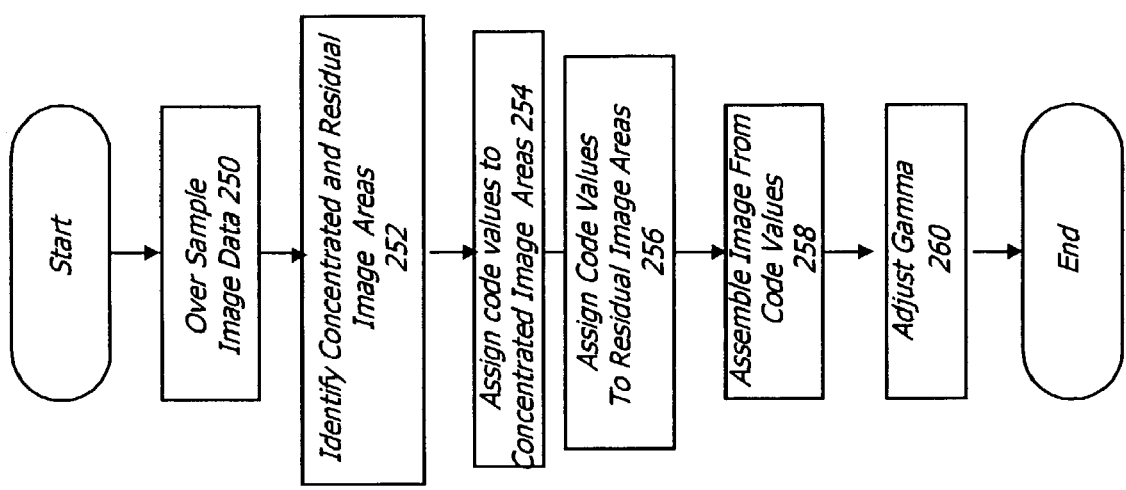
FIG. 12 shows a flow diagram of an embodiment of an over sampling method for processing an image according to the invention.
Figure 13:
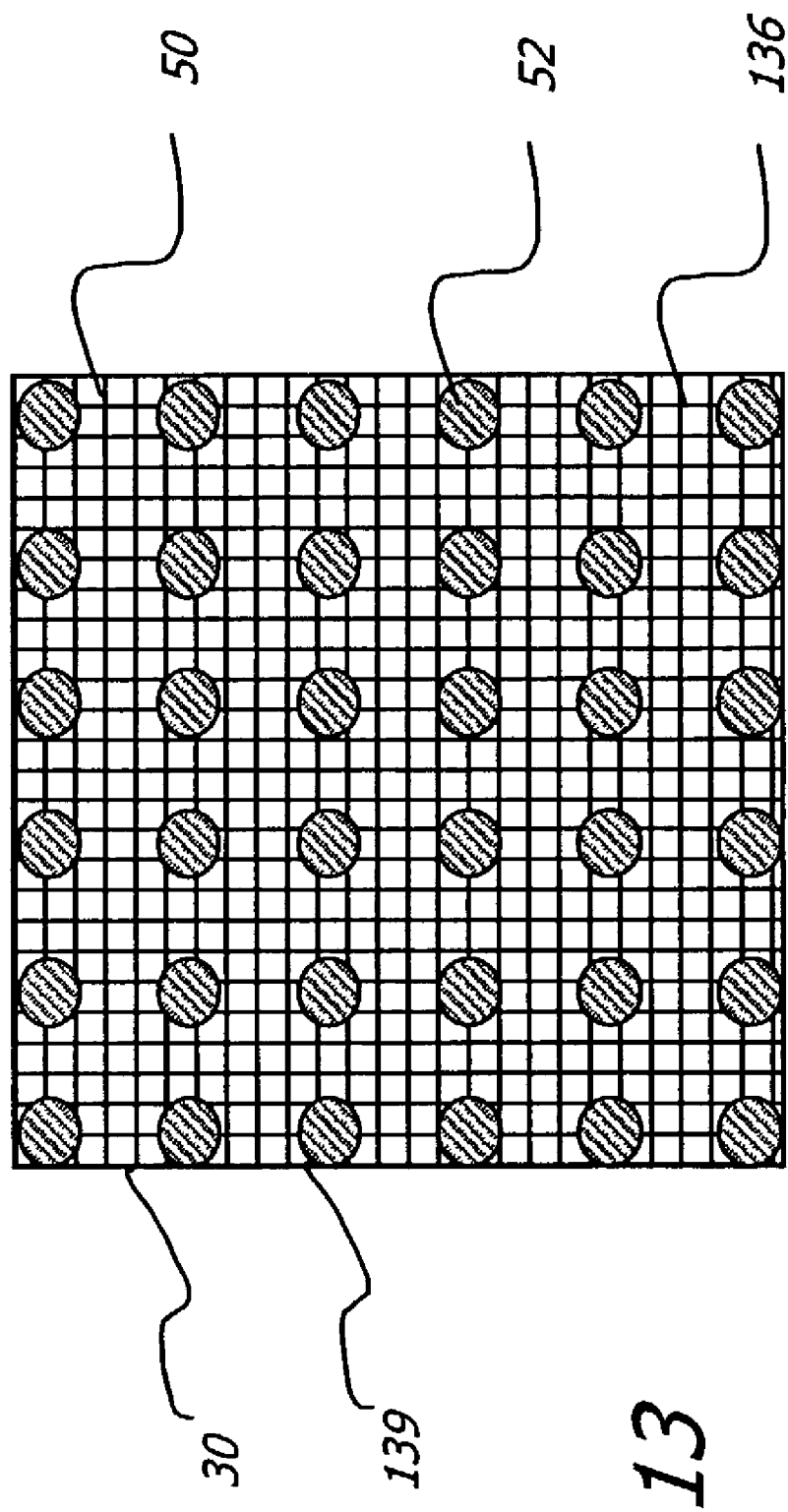
FIG. 13 illustrates an embodiment of an over sampling border aligned with dot encoded imaging information and usable with the embodiment of FIG. 12.

In another embodiment, shown in FIG. 12, an over sampling border is used. An example of this over sampling border is shown in FIG. 13 which depicts a photoprocessed element 38 having concentrated image areas 48 with concentrated image elements 52 and residual image areas 50 after photoprocessing. FIG. 13 also shows an over sampling border 138 superimposed. Over sampling border 138 delineates areas integrated by pixel scanning where the scanning is done at a pitch that is finer than the pitch of the concentrated image elements 52. Since the scanning is done at a pitch finer than that of the dot array, the scanning of partial dots is assured.

An image that is scanned using scanner 144 having an over sampling border 138 can be processed to form an image by averaging as is described above. This can be done by combining code values from oversampled areas 138, e.g. oversampling area 139 in the digital domain by digital signal processor 148.

Figure 14:
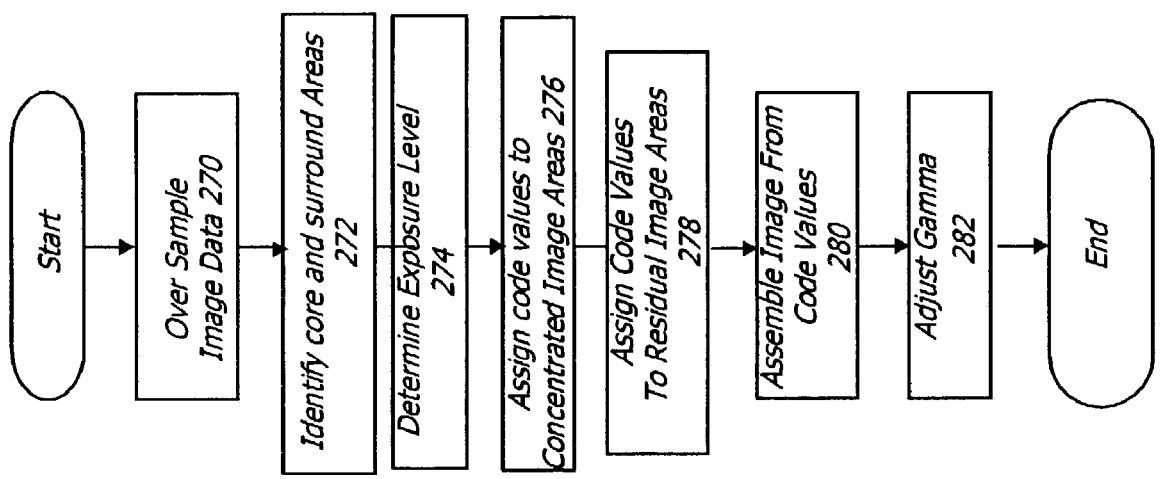
FIG. 14 shows a flow diagram of a method for recovering image data from a surround image.

FIG. 14, shows another embodiment of a method for using an over sampling border 138 to recover an image from photoprocessed element 38 of FIG. 13. In the first step of this embodiment, the image is scanned using an oversampling border 138 (step 250). Areas of the scanned image that represent concentrated image areas 48 and residual image areas 50 are then identified. (step 252) Code values are then assigned.

The concentrated image areas 48 and residual image area 50 are identified by image analysis of the oversampled image data. This can be done, for example, using digital signal processor 148 to execute digital image analysis techniques such as digital edge detection and image signal frequency analysis. These techniques are simplified by the fact that the concentrated image areas 48 will typically be associated with imaging information that has relatively constant or uniform density and predefined shape in each concentrated image area 48 while residual image area 50 can have a less constant shape. Further, concentrated image areas 48 can have a uniform distribution pattern, such as the pattern of dot shaped concentrated image elements 52 shown in FIG. 13. The over sampling data can be examined by digital image processor 64 to identify concentrated image areas 48 and residual image area 50.

The densities of the concentrated image elements 52 are then determined. (step 254) In the embodiment shown, the optional step of associating code values to the residual image area 50 is also performed (step 256). In one embodiment the code values associated with the residual image elements 52 are zeroed and substitute code values are assigned to the zeroed areas by applying known pixel interpolation schemes to the code values of the concentrated image areas 48. Typical examples of pixel interpolation schemes include those utilized in digital cameras employing color filter arrays. Alternatively, pixel interpolation techniques as employed in scanning or image editing programs for up-sampling or smoothing images can be employed. In another embodiment, the concentrated image elements 52 pixel density values are used as previously described to assign density values to the residual image area 50 pixels and the assigned residual image area 50 pixel values are further modified by the actual measured values. This later approach has the benefit of providing finer detail in the resultant digital image. When the pattern of concentration image elements 52 is not communicated to the scanner 144 and associated signal processor 148 the measured densities can be sequentially digitally filtered to identify a dot pitch and the above process steps carried out.

After code values have been assigned to concentrated image elements 52 and/or residual image area 50 the image is assembled using the code values (step 258). This image can then be color corrected. (step 260)

Recovery of Image Data from Residual Image Areas

Figure 15:
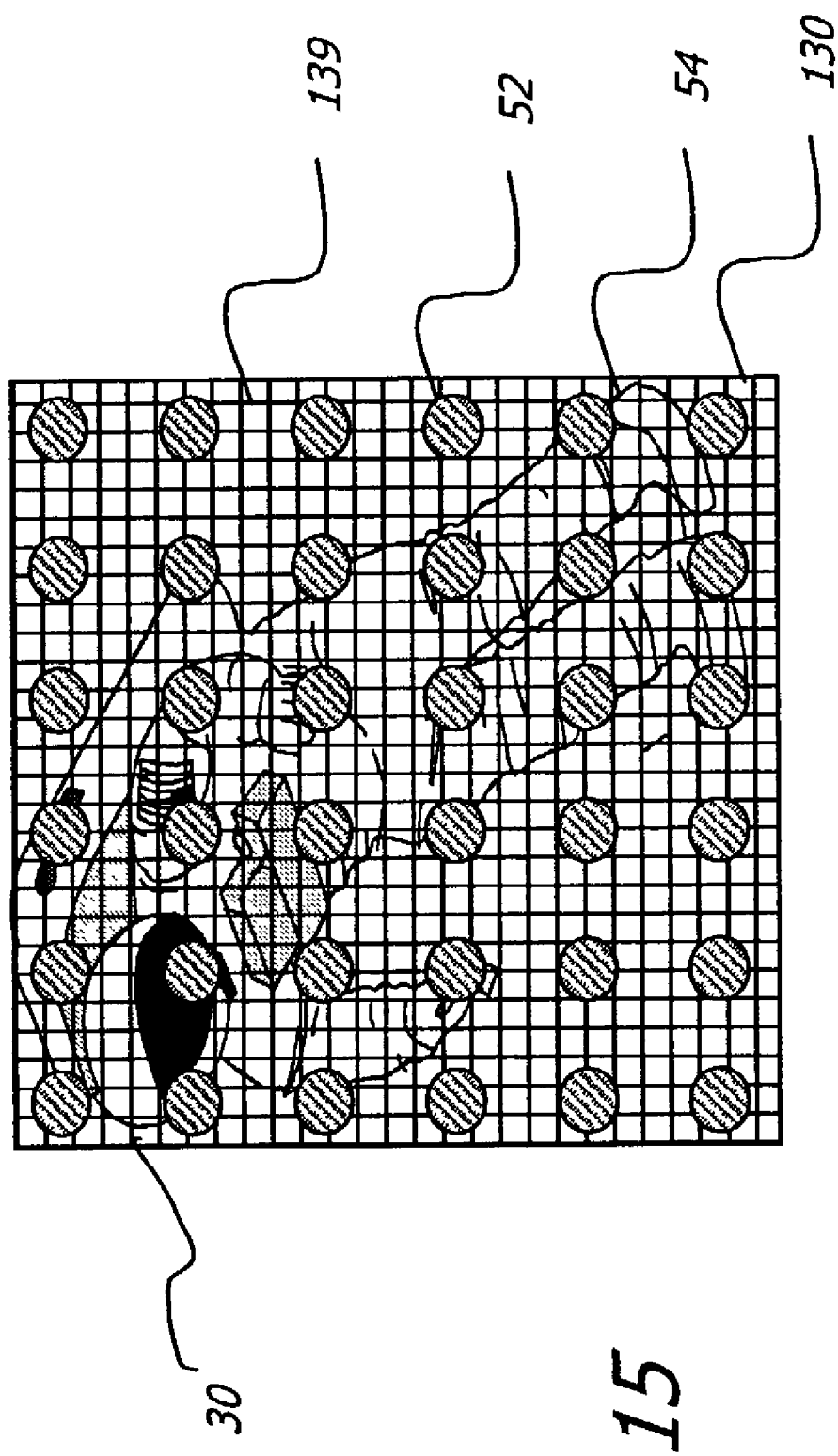
FIG. 15 illustrates an embodiment of an over sampling border aligned with dot encoded imaging information and usable with the embodiment of FIG. 14.

FIG. 15 shows photosensitive element 30 after image wise exposure of photosensitive element 30 to light from a scene that is within a second range of exposure 84 and after development of photosensitive element 30. As is discussed above, when camera 20 is exposed to second exposure range 84 image information is directly recorded on residual image areas 50 of photosensitive element 30 in the form of a residual image 54. Residual image 54 is similar to the image formed by conventional photography techniques. The presence of such an image on photoprocessed element 38 can be identified in various ways. In a first embodiment the presence of a residual image 54 can be identified by detecting a signal encoded on photoprocessed element 38 by camera 20. This signal can be encoded on photosensitive element 30 using optical, mechanical or magnetic encoding techniques as described above. Camera 20 records such a signal in response to exposure conditions that indicate that an image will be formed in the residual image areas 50.

Under low exposure conditions, scene information is carried in the concentrated image areas 48. Under high exposure conditions, scene information is carried in the residual image areas 50. Where exposure conditions overlap, scene information is carried in both areas. Further, it will be appreciated that exposure conditions can vary within an image and, therefore, that where a scene contains a wide range of exposure levels, it can occur that the exposure level in one portion of the image will be within the first exposure range 84 while the exposure level in the second portion of the same image will be in the second exposure range 86. Thus, in such an image, part of the image information will be in concentrated image areas 48 while another part of the image information will be in residual image areas 50. Where this occurs, a single output image is composed by assembling the output image using image information for both concentrated image areas 48 and residual image areas 50. An image formed in this manner will contain imaging information representative of a scene exposure over a range that includes the entire effective photosensitive element latitude.

The residual image 54 of FIG. 14 is punctuated by the pattern of dot shaped concentrated image elements 52 created by the exposure of the concentrated fraction 44 into concentrated image areas 48. Thus, if residual image 54 is printed using conventional photofinishing techniques, the resultant image will exhibit a pattern of dot shaped concentrated image elements 52. It will be appreciated that such a resultant image will be unlikely to receive consumer acceptance. Thus, the formation of an output image based upon a residual image 54 requires the removal of concentrated image elements 52. In this regard, it will be appreciated that where concentrated image elements 52 are overexposed, it is possible to remove the appearance of concentrated image elements 52 from the image by averaging the image and using a color density correction. This however, effectively reduces the apparent resolution of the output image.

In a preferred embodiment, a rectangular grid defining an over sampling border 138 is used to scan the photosensitive element 30. An example of a residual image 54 having dot shaped concentrated image elements 52 with oversampling boarder 138 overlayed as shown in FIG. 15. Over sampling border 138 delineates areas integrated by scanning where the scanning is done at a pitch that is finer than the pitch of the dot shaped concentrated image elements 52.

The method shown in the flow diagram of FIG. 14 can also be used to recover image data from a residual image 54 recorded on photoprocessed element 38 as shown in FIG. 15. The first step in this process is to scan the image using the over sampling border 138. (step 270) The sampling areas within the image are then associated with concentrated image areas 48 or as residual image area 50. (step 172). In this embodiment, the presence of residual image 54 is detected by comparing the densities associated with different portions of the residual image areas 50. (step 274) It will be appreciated that any of the other techniques described above can be used to identify the presence of a residual image 52 or photoprocessed element 38.

Once it has been determined that a residual image 54 is recorded in the residual image area 50, the code values associated with the residual image area is assigned. (step 276)

Code values can also be assigned to the concentrated image elements 52. (step 278) This is done to remove the appearance of dot shaped concentrated image elements 52 from the output image. Typically this is done by extracting the code values of the dot shaped concentrated image elements 52 from the output image and interpolating code values for concentrated images areas 48 based upon the code values associated with the residual image 54. However, as noted above, where an images is captured in a range where first range 84 and second range 86 overlap, code values from both concentrated image areas 48 and residual image 54 can be used to form the output image. In this circumstance, code values from the concentrated image element 52 can be used to help guide the interpolation process.

An output image is formed by assembling the code values for the concentrated image areas 48 and the residual image area 50. (step 280) This image can then be color adjusted. (step 282).

In another embodiment, (not shown) an output image can be formed by scanning photoprocessed element 38 to obtain code values from concentrated image element 52 and residual image 54. Imperfections associated with the high density repetitive patterns can then be suppressed by digital transformation into the frequency domain, i.e. using the well known Fourier transform, and removal of image power at the repetitive frequency unique to the micro-lens array used to form the initial exposure. Upon re-conversion to the spatial domain, a cleaned image in digital form is available for further processing or storage as otherwise already described.

Post Recovery Image Processing

After an output image is recovered, it may be desirable to perform additional processing of the output image. As is shown in FIG. 3, this additional processing can be done to further improve the image. (step 112)

It is to be appreciated that while the image is in electronic or digital form, the image processing is not limited to the specific manipulations described above. Other useful image manipulation sequences are described by EP-A-0 961,482 (Buhr et al.), EP-A-0 961,483 (Buhr et al.), EP-A-0 961,484 (Buhr et al.), EP-A-0 961,485 (Buhr et al.) and EP-A-0 961,486 (Buhr et al.), the disclosures of all of which are incorporated by reference. While the image is in digital form, additional image manipulation may be used including, but not limited to, scene balance algorithms (to determine corrections for density and color balance based on the densities of one or more areas within the processed film), tone scale manipulations to amplify photosensitive element underexposure gamma as described in U.S. Pat. No. 5,134,573 (Goodwin et al.), non-adaptive or adaptive sharpening via convolution or unsharp masking, red-eye reduction, and non-adaptive or adaptive grain-suppression. Moreover, the image may be artistically manipulated, zoomed, cropped, and combined with additional images or other manipulations as known in the art.

Besides digital manipulation, the digital images can be used to change physical characteristics of the image, such as "windowing" and "leveling" (used in computed tomography scanning) or other manipulations known in the art.

Once the image has been corrected and any additional image processing and manipulation has occurred, the image may be electronically transmitted to a remote location or locally written to a variety of output devices as shown in FIG. 8 including, but not limited to, photosensitive element recorder 156, printer 174, thermal printers, electrophotographic printers, ink-jet printers, display 152, CD or DVD disks 168, magnetic electronic signal storage disks 164, and other types of storage devices 150 and display devices known in the art. In this regard, the embodiment of FIG. 3 shows the optional step of processing the image to adapt it for the end use. (step 114) For example, output image-bearing signals can be adapted for a reference output device, can be in the form of device-specific code values or can require further adjustment to become device specific code values. Such adjustment may be accomplished by further matrix transformation or 1-dimensional look-up table transformation, or a combination of such transformations to properly prepare the output image-bearing signals for any of the steps of transmitting, storing, printing, or displaying them using the specified device. As is also shown in the embodiment in FIG. 3, the further step of delivering the image (step 116) can also be performed.

The invention has been described in detail with particular reference to certain preferred embodiments thereof, but it will be understood that variations and modifications can be effected within the spirit and scope of the invention.

| PARTS LIST | |
|---|---|
| 20 | camera |
| 21 | camera body |
| 22 | taking lens system |
| 23 | aperture |
| 24 | scene |
| 24' | image of scene |
| 25 | optical axis |
| 26 | gate |
| 27 | shutter system |
| 30 | photosensitive element |
| 32 | photosensitive layer |
| 34 | substrate |
| 36 | imaging area |
| 38 | photoprocessed element |
| 40 | micro-lens array |
| 42 | micro-lenses |
| 44 | concentrated fraction |
| 46 | residual fraction |
| 48 | concentrated image areas |
| 50 | residual image area |
| 52 | concentrated image element |
| 54 | residual image |
| 60 | light sensor |
| 62 | controller |
| 63 | lens position detector |
| 64 | photosensitive element type sensor |
| 66 | communication head |
| 70 | scene luminance range |
| 72 | latitude of photosensitive element |
| 74 | lower response threshold |
| 76 | upper response threshold |
| 78 | effective latitude |
| 80 | lower response threshold of desired latitude |
| 82 | upper response threshold of desired latitude |
| 84 | first exposure range |
| 86 | second exposure range |
| 90 | support |
| 100 | exposing step |
| 102 | fracturing step |
| 104 | photoprocess step |

-continued

PARTS LIST

| | |
|---|---|
| 106 | determine imaging information step |
| 108 | scanning step |
| 110 | processed scanned image data |
| 112 | image improvement |
| 114 | process recovered image for intended use step |
| 116 | deliver image step |
| 130 | under sampling border |
| 132 | sampling area |
| 134 | matching sampling border |
| 136 | matching sampling area aligned with concentrated image elements |
| 137 | matching sampling area aligned with residual image area |
| 138 | oversampling border |
| 139 | sampling area |
| 140 | reproduction system |
| 142 | detector |
| 144 | scanner |
| 146 | A/D converter |
| 148 | digital signal processor |
| 150 | storage device |
| 152 | display |
| 154 | network interface |
| 156 | image recorder |
| 158 | photosensitive element |
| 160 | electronic memory |
| 162 | electronic data |
| 164 | magnetic disk |
| 166 | disk drive |
| 168 | optical recording medium |
| 170 | optical writer |
| 172 | receiver media |
| 174 | printer |
| 200 | undersample image data step |
| 202 | determine code values step |
| 204 | average code value within sample areas |
| 206 | assemble image from averaged sample areas |
| 208 | adjust gamma |
| 220 | establishing matching sampling border |
| 222 | concentrated image elements |
| 224 | separate areas aligned with sampling areas |
| 226 | assemble output image from aligned sampling area |
| 228 | adjust gamma step |
| 230 | interpolate step |
| 250 | over sample image data |
| 252 | identify concentrated image area 48 and surround areas |
| 254 | assign code values to code areas |
| 256 | assign code values to residual areas |
| 258 | assemble image from code values |
| 260 | adjust gamma |
| 270 | oversample image data step |
| 272 | identify concentrated image and surround data step |
| 274 | determine exposure level step |
| 276 | assign code values to code areas step |
| 278 | assign code values to concentrated image area 48s step |
| 280 | assign code values to residual step |
| 282 | assemble image from code values step |
| 284 | adjust gamma step |

What is claimed is:

1. A method for using a photosensitive element that is photosensitive to light within a predetermined range of exposures to capture images including exposures that are outside the predetermined range of exposures: the method comprising the steps of:

exposing the photosensitive element to light from a scene;

passing the light from the scene through an array of micro-lenses as the light travels to the photosensitive element, with each micro-lens being adapted to fracture the light from the scene into concentrated and residual portions with the concentrated portions directed at concentrated image areas of the photosensitive element to form a pattern of concentrated image elements providing a concentrated image when light from the scene is within a first exposure range; and with the residual portions of the light directed at a residual image area of the photosensitive element and forming an image in the residual image area of the photosensitive element when light from the scene is within a second exposure range;

wherein the combination of the first exposure range the and second exposure range has a greater range than the predetermined range of exposures.

2. The method of claim 1, wherein light from the scene is concentrated into a plurality of differently concentrated portions with each differently concentrated portion being directed at the photosensitive element to form separate patterns of concentrated image elements on the photosensitive element.

3. The method of claim 1, wherein the light from the scene is concentrated into a plurality of differently concentrated portion by passing the light through an array of micro-lenses having two sets of micro-lenses with each set having different light concentrating characteristics.

4. The method of claim 1, wherein the step of recovering image data from at least one of the images formed on the photosensitive element comprises forming an output image of the scene by using imaging information from the concentrated image elements and removing artifacts of the residual image area from the output image.

5. The method of claim 1, wherein the first range is, at least in part, lower than a lower end of the predetermined exposure range of the photosensitive element.

6. The method of claim 1, wherein the second range is, at least in part, higher than an upper end of the predetermined exposure range of the photosensitive element.

7. The method of claim 1, wherein the first exposure range and second exposure range overlap at least in part.

8. The method of claim 1, wherein the step of recovering image data from at least one of the images formed on the photosensitive element comprises forming an output image of the scene using imaging information from the concentrated image area and the residual image area.

9. The method of claim 1, wherein the first exposure range and second exposure range do not overlap.

10. The method of claim 1, wherein said micro-lenses have a fill-factor of less than 95 percent.

11. The method of claim 1, wherein said micro-lenses have a fill-factor of greater than 30 percent.

12. The method of claim 1, wherein said first exposure range and said second exposure range provide a range that is greater than the latitude of the photosensitive element by a factor of more than 0.3 log E.

13. The method of claim 1, further comprising the steps of detecting the range of exposures in a scene and recording a signal on the photosensitive element indicating the range of exposures in the scene.

14. A photography method comprising the steps of:

exposing a photosensitive element that records a contrast image in response to exposure to light within a predetermined range of exposures;

wherein an array of micro-lenses is positioned between the light from the scene and the photosensitive element with individual ones of the array of micro-lenses being adapted to direct at least one portion of the light at first areas of the photosensitive element so that the photosensitive element can record imaging information from an exposure that is within a first exposure range and, to permit a remaining portion of the light to strike a second area of the photosensitive element so that the photosensitive element can record imaging information from an exposure that is within a second range wherein the combined first exposure range and second exposure range have a greater range than the predetermined range of exposures within which the photosensitive element is photosensitive.

15. The photography method of claim 14, further comprising the steps of:
photoprocessing the photosensitive element;
scanning the processed photosensitive element to obtain imaging data;
separating imaging data scanned from the first areas from imaging data scanned from the second areas;
rendering an output image using imaging data from the second areas where the second image areas contain a contrast image; and
rendering an output image using imaging data from the first areas where the second areas do not contain a contrast image.

16. The photography method of claim 15, wherein the first range is, at least in part, lower than a lower end of the predetermined range of exposures of the photosensitive element.

17. The photography method of claim 15, wherein the second range is, at least in part, higher than an upper end of the predetermined exposure range of the photosensitive element.

18. The photography method of claim 15, wherein the first range and second range overlap at least in part.

19. The photography method of claim 15, wherein the first range and second range do not overlap.

20. The photography method of claim 14, wherein said micro-lenses have a fill-factor of less than 95 percent.

21. The photography method of claim 14, wherein said micro-lenses have a fill-factor of greater than 30 percent.

22. The photography method of claim 14, wherein the first range and the second range provide a range that is greater than the latitude of the photosensitive element by a factor of more than 0.3 log E.

23. A method for forming an output image from a photoprocessed photosensitive element having a first image area with a concentrated light image recorded therein and a second image area for receiving a residual light image; the method comprising the steps of:
scanning the photosensitive element to obtain image data from the first and second image areas;
determining whether the second image area contains an image;
forming an output image based upon image data from the first image area where the second image area does not contain an image; and
forming an output image based at least in part upon image data from the second image area where the second image area contains an image.

24. The method of claim 23, wherein a signal is recorded on the photosensitive element indicating that the photosensitive element contains imaging information in the first image area or the second image area and wherein the step of detecting whether imaging information is encoded in the second image comprises detecting the signal.

25. The method of claim 23, wherein the step of recovering image data from at least one of the images formed on the photosensitive element comprises forming an output image by using imaging information from the first image area and removing artifacts of the second image area from the output image.

26. The method of claim 25, wherein the step of recovering image data from the photosensitive element comprises scanning the photosensitive element using an undersampling scanning border and the step of assembling an image comprises removing artifacts of the second image area from the undersampled imaging information by color correction.

27. The method of claim 25, wherein the step of recovering image data from the photosensitive element comprises scanning the photosensitive element using a matching sampling border and the step of assembling an output image based upon the recovered image data comprises forming the output using samples that contain areas of the photosensitive element associated with the first image area.

28. The method of claim 25, wherein the step of recovering image data from the photosensitive element comprises: scanning the photosensitive element using an oversampling border; and the step of assembling an output image based upon the recovered image data, the step comprises: assembling the output image using samples associated with the first image area.

29. The method of claim 23, wherein the step of recovering image data from at least one of the images formed on the photosensitive element comprises forming an output image of the scene using imaging information from the first image area and second image area.

30. The method of claim 29, wherein the step of removing artifacts of the first image from the second image comprises deriving imaging information from the first and second image to form substitute imaging information and substituting the substitute information in place of the imaging information associated with the first image area.

31. The method of claim 23, wherein the step of recovering image data from at least one of the images formed on the photosensitive element comprises forming an output image of the scene by using imaging information from the second image area and removing artifacts of the first image area from the second image area.

32. The method of claim 31, wherein the step of removing artifacts of the first image from the second image comprises deriving imaging information from second image to form substitute imaging information and substituting the substitute information in place of the imaging information associated with the first image area.

33. The method of claim 23, wherein the step of recovering image data from the photosensitive element comprises scanning the photosensitive element using an under sampling scanning border and the step of assembling an image comprises removing artifacts of the first image area from the under sampled imaging information by color correction.

34. The method of claim 23, wherein the step of recovering image data from the photosensitive element comprises using a matching sampling border and the step of assembling an output image based upon the recovered image data comprises forming the output image using imaging information associated with the second image area.

35. The method of claim 23, wherein the step of recovering image data from the photosensitive element comprises scanning the photosensitive element using an oversampling border and the step of assembling an output image based upon the recovered image data comprises assembling the output image using samples associated with the second image area.

36. The method of claim 27, wherein said scanning is performed at a pitch finer than the pitch of the concentrated image elements.

37. A method for capturing and rendering an output image using a photosensitive element that records images when exposed to predetermined range of exposure intensities, the method comprising the steps of:
exposing the photosensitive element to light from a scene;

fracturing the light from the scene into a first fraction and a second fraction by using an array of micro-lenses with individual micro-lenses being adapted to fracture the light incident upon the micro-lenses by concentrating the first fraction of the light from the scene to form a first image on a first portion of the photosensitive element when the exposure is within a first exposure range and, by passing the second fraction of the light from the scene onto the photosensitive element to form a second image on a second portion of the photosensitive element when the light from the scene is within a second range wherein the combination of the first range and second range is greater than the predetermined range of exposure intensities of the photosensitive element;

photoprocessing the photosensitive element;

recovering image data from at least one of the images formed on the photosensitive element; and assembling an output image based upon the recovered image data.

38. The method of claim 37, wherein the light from the scene is concentrated into a plurality of differently concentrated portions each differently concentrated portion directed at the photosensitive element to create separate concentrated images on the photosensitive element.

39. The method of claim 37, wherein the step of exposing the photosensitive element to light from a scene comprises exposing the photosensitive element for a period of time sufficient to cause an exposure to form in the residual image area.

40. The method of claim 37, wherein the step of recovering image data from at least one of the images formed on the photosensitive element comprises detecting whether imaging information is encoded in a second image.

41. The method of claim 40, further comprising the step of recording a signal on the photosensitive element indicating that the photosensitive element contains imaging information in the first image or the second image and the step of detecting whether imaging information is encoded in the second image comprises detecting the signal.

42. The method of claim 37, wherein the step of recovering image data from at least one of the images formed on the photosensitive element comprises forming an output image of the scene by using imaging information from the first image and removing artifacts of the second image from the output image.

43. The method of claim 37, wherein the step of recovering image data from the photosensitive element comprises scanning the photosensitive element using an undersampling scanning border and the step of assembling an image comprises removing the artifacts of the second image from the under sampled imaging information by color correction.

44. The method of claim 37, wherein the step of recovering image data from the photosensitive element comprises scanning the photosensitive element using a matching sampling border and the step of assembling an output image based upon the recovered image data comprises forming the output using samples that contain areas of the photosensitive element associated with the first image.

45. The method of claim 37, wherein the step of recovering image data from the photosensitive element comprises scanning the photosensitive element using an oversampling border and the step of assembling an output image based upon the recovered image data, comprises assembling the output image using samples associated with the first image.

46. The method of claim 37, wherein the step of recovering image data from at least one of the images formed on the photosensitive element comprises forming an output image of the scene using imaging information from the first and second image.

47. The method of claim 37, wherein the step of removing artifacts of the first image from the second image comprises deriving imaging information from the first and second image to form substitute imaging information and substituting the substitute information in lace of the imaging information.

48. The method of claim 37, wherein the step of recovering image data from at least one of the images formed on the photosensitive element comprises forming an output image by using imaging information from the second image and removing artifacts of the first image from the second image.

49. The method of claim 48, wherein the step of removing artifacts of the first image from the second image comprises deriving imaging information from the second image to form substitute imaging information and substituting the substitute information in place of the imaging information associated with the first image.

50. The method of claim 37, wherein the step of recovering image data from the photosensitive element comprises scanning the photosensitive elements using an under sampling scanning border and the step of assembling an image comprises removing artifacts of the first image from the under sampled imaging information by color correction.

51. The method of claim 37, wherein the step of recovering image data from the photosensitive element comprises using a matching sampling border and the step of assembling an output image based upon the recovered image data comprises forming the output using samples that contain areas of the photosensitive element associated with the second image.

52. The method of claim 37, wherein the step of recovering image data from the photosensitive element comprises scanning the photosensitive element using an oversampling border and the step of assembling an output image based upon the recovered image data comprises assembling the output image using samples associated with the second image area.

53. A camera for recording images on a photosensitive element strip having an emulsion for recording an image when the photosensitive element is exposed to light within a predefined range of exposures, the camera comprising:

a camera body having an aperture;

a camera photosensitive element gate positioning the photosensitive element to confront the aperture;

an array of micro-lenses disposed between said aperture and said photosensitive element, with individual micro-lenses of the array of micro-lenses being adapted to fracture light from a scene into a first fraction and a second fraction wherein the first fraction of light from the scene is concentrated to form a first image on a first portion of the photosensitive element when exposure intensity is within a first range, with said array passing a second fraction of light from the scene onto the photosensitive element to form a second image on a second portion of the photosensitive element when light from the scene is within a second range; and a shutter disposed between said aperture and said micro-lens array controllably permitting of light from the scene to expose the photosensitive element for a predefined period of time, said predefined period of time being defined as sufficient to form an image on said second portion of the photosensitive element when light from the scene is within a second range.

54. The camera of claim 53, wherein the combination of the first range and the second range is greater than the predetermined range of exposure intensity of the photosensitive element.

55. The camera of claim 53, wherein said array of micro-lenses comprises an array of uniformly distributed micro-lenses.

56. The camera of claim 53, wherein said array of micro-lenses comprises an array of aspherical micro-lenses.

57. The camera of claim 53, wherein said array of micro-lenses comprises an array of acylindrical micro-lenses.

58. The camera of claim 53, further comprising a lens system that focuses light from the scene to form an image at the array of micro-lenses.

59. The camera of claim 53, wherein said array of micro-lenses comprises an array of different micro-lenses, said array of micro-lenses having a set of focal distances, each one of the set of focal distances being associated with an individual one of the micro-lenses.

60. The camera of claim 53, wherein said photosensitive element comprises a plurality of layers and the set of focal distances is defined so that each one of the set of focused distances focuses light from a scene onto a different one of the layers of the photosensitive element.

61. The camera of claim 53, wherein the f-number of the micro-lenses is between f-1.5 and f-16.

62. The camera of claim 53, wherein the f-number of the micro-lenses is between f-2 and f-7.

63. The camera of claim 53, wherein said array of micro-lenses is positioned on a support.

64. The camera of claim 53, wherein the ratio of highest to lowest refractive index between the support and the array of micro-lenses is between 0.8 and 1.2.

65. The camera of claim 64, wherein the ratio of highest to lowest refractive index between the support that the array of micro-lenses is between 0.95 and 1.05.

66. The camera of claim 64, wherein said support comprises said photosensitive element.

67. The camera of claim 63, wherein the support is formed from a substrate and said array of micro-lenses are formed from the same substrate.

68. The camera of claim 63, wherein the percentage of the unit area of the photosensitive element covered with a distribution of micro-lenses is between 20% to 100%.

69. The camera of claim 53, wherein the percentage of unit area of the photosensitive element covered by the array of micro-lenses is greater than 75%.

70. The camera of claim 53, wherein the separation between micro-lenses is between 3 and 100 microns.

71. The camera of claim 53, further comprising a light detector for detecting the level of scene brightness and said camera further comprises a camera controller and camera write head for writing a signal on the that an image will be recorded in the second portion of the film.

72. A camera for recording images on a photosensitive element having an emulsion for recording an image when the photosensitive element is exposed to light within a predefined range of exposures, the camera comprising:
a camera body having an aperture;
a camera photosensitive element gate positioning the photosensitive element to confront the aperture;
an array of micro-lenses disposed between said lens system and said photosensitive element with individual micro-lenses of said array of micro-lenses fracturing light from a scene into a set of more than one differently concentrated fractions with each concentrated fraction forming an image on a predefined area of the photosensitive element in response to a different range of light intensities within a first range of light intensities, said array passing another fraction of light from the scene onto the photosensitive element to form a residual image on a predefined portion of the photosensitive element when light from the scene is within a second range; and
a shutter disposed between said aperture and said micro-lens array to expose the photosensitive element to light from the scene for a predefined exposure time, said predefined period of time being defined as sufficient to form an image on said second portion of the photosensitive element when light from the scene is within the second range.

73. The camera of claim 72, wherein the array of micro lenses comprises a set of different micro-lens types each type concentrating light to a different extent.

74. The camera of claim 73, wherein the distribution of different types of micro-lenses in the array is uniform.

75. The camera of claim 73, wherein each of said micro-lenses types has a different focal distance.

76. The camera of claim 73, wherein said photosensitive element comprises a plurality of layers and the focal distances of the micro-lens types are defined so that each one of the set of different focus distances is defined focuses light from a scene onto a different one of the layers of the photosensitive element.

77. The camera of claim 73, wherein said camera further comprises a light sensor detecting the amount of light in an exposure, a processor to determine the amount of light in an exposure and a signal generator to record a signal on the photosensitive element indicating which portions of the photosensitive element contain imaging data associated with that amount of light.

78. An image rendering system for forming an output image from a developed photosensitive element having at least one image area having a concentrated exposure recorded thereon and at least one image area for receiving a residual exposure; the system comprising:
an optical scanner to obtain image data from the photosensitive element; and
a processor for analyzing the image data and determining whether a residual exposure is recorded on the developed photosensitive element; with said processor forming an output image based upon image data from the at least one of the image area having a concentrated exposure recorded thereon, and forming an output image based at least in part upon image data from the image area for receiving a residual exposure where a residual exposure is recorded on the exposed photosensitive element.

79. The image rendering system of claim 78, wherein said photosensitive element has a recorded signal indicating that the photosensitive element contains a residual exposure and said scanner detects the signal and directs the processor to form an output image using at least some of the image data from the residual exposure.

80. The image rendering system of claim 78, wherein said photosensitive element has signal that is not optically detectable indicating that an residual exposure is recorded and said system further comprises a detector having a sensor to detect the signal with said detector providing a signal from which the processor can determine that a residual exposure is recorded on the developed photosensitive element.

81. The image rendering system of claim 78, wherein said optical scanner obtains imaging information for the image area for receiving a residual exposure and the processor determines whether a residual image is recorded on the photosensitive element at least in part by examining the imaging information from the image area for receiving a residual exposure.

82. The image rendering system of claim 78, wherein the processor forms an output image of the scene by using imaging information from the concentrated exposure and removing artifacts of the second image from the output image.

83. The image rendering system of claim 78, wherein the scanner scans the photosensitive element using an undersampling scanning border and the processor assembles an output image by removing artifacts of the residual exposure from the under sampled imaging information using color correction.

84. The image rendering system of claim 78, wherein the scanner scans the photosensitive element using a matching sampling border and the processor assembles an output image based upon the recovered image data comprises forming the output using samples that contain areas of the photosensitive element associated with the concentrated exposure.

85. The image rendering system of claim 78, wherein the scanner scans the photosensitive element using an oversampling border and the processor assembles an output image based upon the recovered image data, and the processor assembles the output image using samples associated with the concentrated exposure area.

86. The image rendering system of claim 78, wherein the processor forms an output image of the scene using imaging information from the concentrated and the residual exposure.

87. The image rendering system of claim 78, wherein the processor removes artifacts of the concentrated exposure from the residual exposure by deriving substitute imaging information from the concentrated exposure and the residual exposure and substituting the substitute information in place of the imaging information associated with the concentrated exposure.

88. The image rendering system of claim 78, wherein the processor forms an output image of the scene by using imaging information from the residual exposure and removing artifacts of the concentrated exposure from the residual exposure.

89. The image rendering system of claim 78, wherein the processor forms an output image of the scene by deriving imaging information from the residual exposure to form substitute imaging information and substituting the substitute information in place of the imaging information associated with the concentrated exposure.

90. The image rendering system of claim 78, wherein the scanner scans the photosensitive element using an under sampling scanning border and the processor assembles an image by removing artifacts of the concentrated exposure from the under sampled imaging information using color correction.

91. The image rendering system of claim 78, wherein the scanner scans the photosensitive element using a matching sampling border and the processor assembles an output image based upon the recovered image data by forming the output image using samples that contain areas of the photosensitive element associated with the residual exposure.

* * * * *